(12) United States Patent
Sun et al.

(10) Patent No.: US 8,433,893 B2
(45) Date of Patent: Apr. 30, 2013

(54) PRIVACY-PRESERVING PROBABILISTIC INFERENCE BASED ON HIDDEN MARKOV MODELS

(75) Inventors: Wei Sun, Cambridge, MA (US); Shantanu Rane, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 170 days.

(21) Appl. No.: 13/076,418

(22) Filed: Mar. 30, 2011

(65) Prior Publication Data

US 2012/0254605 A1  Oct. 4, 2012

(51) Int. Cl.
*H04L 29/06*  (2006.01)

(52) U.S. Cl.
USPC .......................................... 713/150

(58) Field of Classification Search .................. 713/150, 713/153, 168, 169; 380/255, 275
See application file for complete search history.

(56) References Cited

U.S. PATENT DOCUMENTS 7,937,270 B2 * 5/2011 Smaragdis et al. ........... 704/256
2008/0172233 A1 7/2008 Smaragdis

OTHER PUBLICATIONS

Manas A. Pathak: "Privacy Preserving Techniques for Speech Processing," Dec. 1, 2010, pp. 1-54 XP55030120, retreived from the internet: URL:http://www.cs/cmu.edu/"manas/proposal.pdf.

* cited by examiner

*Primary Examiner* — Edward Zee
(74) *Attorney, Agent, or Firm* — Gene Vinokur; Dirk Brinkman

(57) ABSTRACT

Parameters of a hidden Markov model (HMM) are determined by a server based on an observation sequence stored at a client, wherein the client has a decryption key and an encryption key of an additively homomorphic cryptosystem, and the server has only the encryption key. The server initializes parameters of the HMM and updates the parameters iteratively until a difference between a probability of the observation sequence of a current iteration and a probability of the observation sequence of a previous iteration is above a threshold, wherein, for each iteration, the parameters are updated based on an encrypted conditional joint probability of each pair of states given the observation sequence and the parameters of the HMM, wherein the encrypted conditional probability is determining in an encrypted domain using a secure multiparty computation (SMC) between the server and the client.

16 Claims, 21 Drawing Sheets

100

200

300

400

500

600

700

Input: Client sores observation sequence $x_1, x_2, ..., x_T$. Server stores the HMM $\lambda = (A, B, \Pi)$.

Output: Bob determines $\xi(\log Pr\{x_1, x_2, ..., x_T | \lambda\})$.

1. For each $t = 1, 2, ..., T$ and $j = 1, 2, ..., N$, server randomly selects $\gamma_{tj}$ and generates a column vector $\log \mathbf{b}_j + \gamma_{tj}$.

2. Based on the observation $x_t$, client uses 1-of-M OT to determine $\log b_j(x_t) + \gamma_{tj}$.

3. Client transmits $\xi(\log b_j(x_t) + \gamma_{tj})$ to server.

4. Using $\gamma_{tj}$ and the homomorphic property, server determines
$\xi(\log b_j(x_t) + \gamma_{tj}) \cdot \xi(-\gamma_{tj}) = \xi(\log b_j(x_t))$ for $j = 1, 2, ..., N$, $t = 1, 2, ..., T$.

5. Server determines $\xi(\log \alpha_1(j)) = \xi(\log \pi_j) \cdot \xi(\log b_j(x_1))$ for $j = 1, 2, ..., N$.

6. Induction Step: For $j = 1, 2, ..., N$, with input $\xi(\log \alpha_t(j))$, $j = 1, 2, ..., N$ and transition matrix $A = (a_{ij})$, server and client execute H-LogSum method, at the end of which server determines $\xi(\log \sum_{l=1}^{N} \alpha_t(l) a_{lj})$.

7. For all $1 \leq t \leq T - 1$, server determines
$\xi(\log \alpha_{t+1}(j)) = \xi(\log \sum_{l=1}^{N} \alpha_t(l) a_{lj}) \cdot \xi(\log b_j(x_{t+1}))$ 8. Server and client execute H-LogSum method, the end of which server determines $\xi(\log \sum_{j=1}^{N} \alpha_T(j)) = \xi(\log P(x_1, x_2, ..., x_T | \lambda))$

1. Server determines $\xi(\log b_j(\mathbf{x}_t))$ for $j=1,2,\ldots,N$, $t=1,2,\ldots,T$;

2. Given the encryption $\xi(\log \beta_{t+1}(j))$, server determines
$\xi(\log \beta_{t+1}(j)a_{ij}b_j(\mathbf{x}_{t+1})) = \xi(\log \beta_{t+1}(j) + \log a_{ij} + \log b_j(\mathbf{x}_{t+1}))$
$= \xi(\log \beta_{t+1}(j))\xi(\log a_{ij})\xi(\log b_j(\mathbf{x}_{t+1}))$.

3. Using H-Exponent method, server determines $\xi(\beta_{t+1}(j)a_{ij}b_j(\mathbf{x}_{t+1}))$, and
$$\xi(\beta_t(i)) = \xi\left(\sum_{j=1}^{N}\beta_{t+1}(j)a_{ij}b_j(\mathbf{x}_{t+1})\right) = \prod_{j=1}^{N}\xi(\beta_{t+1}(j)a_{ij}b_j(\mathbf{x}_{t+1}))$$

4. Using H-Logarithm method, server determines the encryption $\xi(\log \beta_t(i))$, $i=1,2,\ldots,N$, until server has $\xi(\log \beta_1(i))$, $i=1,2,\ldots,N$.

5. Using homomorphic property and the H-Exponent method, server determines $\xi(\pi_j \beta_1(j)b_j(\mathbf{x}_1))$ and $\xi(\sum_j \pi_j \beta_1(j)b_j(\mathbf{x}_1))$.

6. Using the H-Logarithm method, server determines $\xi(\log P(\mathbf{x}_1, \mathbf{x}_2, \ldots, \mathbf{x}_T \mid \lambda))$.

Input: Client stores an observation sequence $\mathbf{x}_1, \mathbf{x}_2, \ldots, \mathbf{x}_T$. Server stores the HMM $\lambda = (A, B, \Pi)$.

Output: Client determines the most probable state sequence $S_{i_1^*}, S_{i_2^*}, \ldots, S_{i_T^*}$.

1. For each $t = 1, 2, \ldots, T$ and $j = 1, 2, \ldots, N$, server selects $\gamma_{tj}$, generates a column vector $\log b_j + \gamma_{tj}$ and transmits the column vector to client.

2. Using 1-of-$M$ OT client determines $\log b_j(\mathbf{x}_t) + \gamma_{tj}$.

3. Client transmits $\xi(\log b_j(\mathbf{x}_t) + \gamma_{tj})$ to server.

4. Using $\gamma_{tj}$ and the homomorphic property, server determines
$\xi(\log b_j(\mathbf{x}_t) + \gamma_{tj}) \cdot \xi(-\gamma_{tj}) = \xi(\log b_j(\mathbf{x}_t))$ for $j = 1, 2, \ldots, N$, $t = 1, 2, \ldots, T$.

5. Server determines $\xi(\log \delta_1(j)) = \xi(\log \pi_j) \cdot \xi(\log b_j(\mathbf{x}_1))$ for $j = 1, 2, \ldots, N$.

6. Iteration: Server determines $\xi(\log \delta_t(i) + \log a_{ij}) = \xi(\log \delta_t(i)) \cdot \xi(\log a_{ij})$ for all $i, j = 1, 2, \ldots, N$ and $t$. For each pair $(t, j)$, server and client execute the secure maximum finding protocol with an input $\{\xi(\log \delta_t(i) + \log a_{ij}) : i = 1, 2, \ldots, N\}$, and then server determines the encryption of the maximum $\xi(\max_i [\log \delta_t(i) + \log a_{ij}])$, and
$\xi(\log \delta_{t+1}(j)) = \xi(\max_i [\log \delta_t(i) + \log a_{ij}]) \cdot \xi(\log b_j(\mathbf{x}_t))$.

7. Server transmits indexes $\phi_{t+1}(j)$.

8. At the end of iteration, client receives the last an index matrix $[\phi_t(j)]_{tj}$, so client can track backward and determined the state sequence.

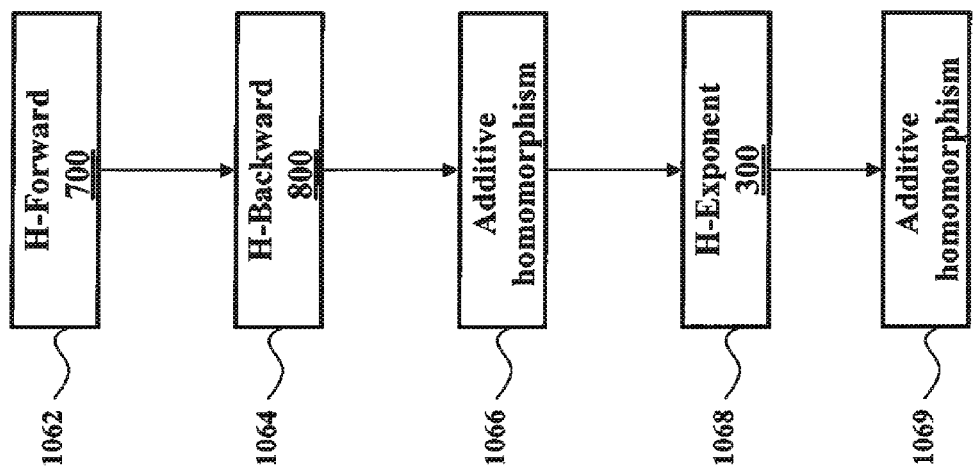

Input: Client stores the observation sequence $x_1,\ldots,x_T$ and encryption and decryption key. Server stores the encryption key only.

Output: Server determines HMM parameters and without discovering anything about the observation sequence. Client determines no information about the parameters.

1. Server initializes the HMM parameters $\lambda = (A,B,\Pi)$.
2. Using H-Forward and H-Backward methods with input $x_1,\ldots,x_T$ and $\lambda$, server determines $\xi(\log \alpha_t(i))$, $\xi(\log \beta_{t-1}(j))$, $\xi(\log b_j(x_{t-1}))$ and $\xi(-\log \Pr\{x_1,\ldots,x_T \mid \lambda\})$.
3. Server determines $\xi(\log \gamma_t(i,j))$ from Equation (16).
4. Using H-Exponent method, server determines $\xi(\zeta_t(i,j))$ and $\xi(\gamma_t(i)) = \prod_{j=1}^N \xi(\zeta_t(i,j))$ using the homomorphic property of the encryption function $\xi$.
5. Server randomly selects $\theta_t$ and transmits to client the encryptions $\xi(\theta_t + \gamma_1(i))$. Client decrypts and transmits to server $\theta_t + \gamma_1(i)$, and server determines $\bar{\pi}_1 = \gamma_1(i)$.
6. Server determines the encryption $\xi(\sum_{t=1}^{T-1}\gamma_t(i,j)) = \prod_{t=1}^{T-1}\xi(\zeta_t(i,j))$ and $\xi(\sum_{t=1}^{T-1}\gamma_t(i)) = \prod_{t=1}^{T-1}\xi(\gamma_t(i))$. Using H-Logarithm method, server determines $\xi(\log \sum_{t=1}^{T-1}\zeta_t(i,j))$, $\xi(\log \sum_{t=1}^{T-1}\gamma_t(i))$ and the encryption $\xi(\log \bar{a}_{ij}) = \xi(\log \sum_{t=1}^{T-1}\zeta_t(i,j))\xi(\log \sum_{t=1}^{T-1}\gamma_t(i))$, and then server determines $\bar{a}_{ij}$ using SMC with client.
7. Using H-SumPartition method with input sequence $x_1,\ldots,x_T$ and encryptions $\xi(\gamma_t(i))$, $t = 1,2,\ldots,T$. Using H-Comparison method, server determines the common element $v_k$, server determines $\xi(\sum_{t=1,x_t=v_k}^T \gamma_t(j))$ and $\bar{b}_j(v_k)$ according to Equation (13).

Accordingly, server updates parameters of HMM $\bar{\lambda} = (\bar{A},\bar{B},\bar{\Pi})$.

8. Using the H-Forward method having as input the observation sequence and $\bar{\lambda}$, server determines $\Pr\{x_1,x_2,\ldots,x_T \mid \bar{\lambda}\}$.
9. Using H-Comparison method difference $\Pr\{x_1,x_2,\ldots,x_T \mid \bar{\lambda}\} - \Pr\{x_1,x_2,\ldots,x_T \mid \lambda\} \leq D$ is compared to threshold. If difference below threshold, server stops the method and selects the parameters $\bar{\lambda}$ as final; otherwise, server updates $\lambda := \bar{\lambda}$ in step 1 with $\bar{\lambda}$ and repeats previous steps.

FIG. 10F

PRIVACY-PRESERVING PROBABILISTIC INFERENCE BASED ON HIDDEN MARKOV MODELS

FIELD OF THE INVENTION

This invention relates generally to probabilistic inference based on hidden Markov models, and more particularly to privacy-preserving computation between a server computer and a client computer for probabilistic inference based on hidden Markov models.

BACKGROUND OF THE INVENTION

Probabilistic inference based on Hidden Markov Models (HMMs) is common in machine learning, speech processing, and gene sequence analysis. Probabilistic inference with privacy constraints is a relatively unexplored area of research and applies to a multi-party scenario in which the data and the HMMs belong to different parties and cannot be shared. For example, a client computer (Alice) needs to analyze speech data from telephone calls. Alice outsources the speech recognition task to a server computer (Bob), who possesses the HMMs obtained from a trained database. Alice cannot share the speech data with Bob owing to privacy concerns, while Bob cannot disclose the HMM parameters, which can reveal information about the training database.

One method for secure inference via HMMs is based on privacy-preserving two-party maximization methods, in which both parties incur exactly the same protocol overhead. However, that method is not suited for applications where a thin client encrypts the data and transmits the encrypted data to the server for performing most of the computationally intensive tasks.

HMM and Three Basic Problems of HMMs

The HMM is a generalization of a Markov chain, in which a state of the HMM is not directly known but generates an output which can be analyzed. The outputs are also referred to as "observations." Because the observations depend on a hidden state of the HMM, the observation can reveal information about the hidden state.

The HMM $\lambda$ is a triple of parameters $\lambda=(A, B, \Pi)$ A matrix A, $A=(\alpha_{ij})$, is a state transition matrix, $\alpha_{ij}$ is a transition probability from a state $S_i$ to a state $S_j$, wherein $1 \leq i, j \leq N$, and N is a number of states of the HMM, $\alpha_{ij}=Pr\{q_{t+1}=S_j|q_t=S_i\}$, $1 \leq i, j \leq N$, where $\{S_1, S_2, \ldots, S_N\}$ is a set of states, and $q_t$ is the state at time t, and Pr is the joint probability.

A matrix B, $B=(b_1, b_2, \ldots, b_N)$, is a matrix of probabilities of observations, $b_j$ is a column vector of the matrix of probabilities over a known alphabet of the observation sequence, $j=1, 2, \ldots, N$. Thus, $b_j(v_k)=Pr\{x_t=v_k|q_t=S_j\}$, $1 \leq j \leq N$, $1 \leq k \leq M$, where $\{v_1, v_2, \ldots, v_M\}$ is the alphabet of observation symbols, and $x_t$ is the observation at time t. A vector $\Pi$, $\Pi=(\pi_1, \pi_2, \ldots, \pi_N)$, is an initial state probability vector of the HMM, wherein $\pi_i=Pr\{q_1=S_i\}$.

For the observation sequence $x_1, x_2, \ldots, x_T$ and the HMM $\lambda=(A, B, \Pi)$, one problem is to determine the probability of the observation sequence with respect to the HMM, i.e., $Pr\{x_1, x_2, \ldots, x_T|\lambda\}$. Solutions for this problem in unsecure domain include a forward algorithm and a backward algorithm.

In statistical parsing, e.g., gene sequence analysis and natural language processing, a main problem is to determine a most likely sequence of states corresponding to the observation sequence with respect to the HMM. The problem is to efficiently compute the joint probability $Pr\{q_1, q_2, \ldots, q_T, x_1, x_2, \ldots, x_T|\lambda\}$ for the HMM $\lambda=(A, B, \Pi)$. The problem is usually solved in the unsecure domain by a Viterbi algorithm.

Another problem is to determine parameters of the HMM based on the observation sequence. One solution to this problem in the unsecure domain includes the Baum-Welch algorithm.

Forward Algorithm

A joint probability of an observation sequence in state $S_j$ at time t is $$\alpha_t(j)=Pr\{x_1, x_2, \ldots, x_t, q_t=S_j|\lambda\}. \quad (1)$$

The forward algorithm in the unsecure domain includes the following steps.
1. initializing $\alpha_1(j)=\pi_j b_j(x_1)$, $1 \leq j \leq N$;
2. determining, for each state $S_j$, $1 \leq j \leq N$, and for all observations t, $1 \leq t \leq T-1$, a likelihood of the observation sequence according to
3.

$$\alpha_{t+1}(j) = \left[\sum_{i=1}^{N} \alpha_t(i)a_{ij}\right] b_j(x_{t+1}); \quad (2)$$

4. determining the probability according to
5.

$$Pr\{x_1, x_2, \ldots, x_T | \lambda\} = \sum_{j=1}^{N} \alpha_T(j).$$

Backward Algorithm

A backward probability is defined according to

1. $\beta_t(j)=Pr\{x_{t+1}, x_{t+2}, \ldots, x_T|q_t=S_j, \lambda\}. \quad (3)$

The backward algorithm in the unsecure domain includes:
1. initializing $\beta_T(j)=1$, $1 \leq j \leq N$;
2. for each $1 \leq i \leq N$ and for all $1 \leq t \leq T-1$, determining
3.

$$\beta_t(i) = \sum_{j=1}^{N} \beta_{t+1}(j)a_{ij}b_j(x_{t+1}); \text{ and} \quad (4)$$

4. determining the probability according to
5.

$$Pr(x_1, x_2, \ldots, x_T | \lambda) = \sum_{j=1}^{N} \pi_j b_j(x_1)\beta_1(j)$$

Viterbi Algorithm

A probability of most probable state sequence ending in the state $S_j$ for the observation sequence at time t is determined according to $$\delta_t(j) = \max_{q_1, q_2, \ldots, q_{t-1}} Pr\{q_1, q_2, \ldots, q_{t-1}, q_t = S_j, x_1, x_2, \ldots, x_t | \lambda\}, \quad (5)$$

where max is a function of a maximum value.

The Viterbi algorithm in the unsecure domain includes the following steps:

1. Initializing, for all $1 \leq j \leq N$, the most probable state sequence according to $\delta_1(j)=\pi_j b_j(x_1)$ and initializing a matrix of indexes of probable states as $\phi_1(j)=0$;
2. Determining a probability of the most probable state sequence ending in a state $S_j$ or a next time t+1 and the matrix of indexes according to $$\delta_{t+1}(j) = \max_{i=1,\ldots,N} \{\delta_t(i) a_{ij}\} b_j(x_t) \quad (6)$$

$$\phi_{t+1}(j) = \arg\max_{i=1,\ldots,N} \{\delta_t(i) a_{ij}\} \quad (7)$$

for all $1 \leq j \leq N$ and at each $1 \leq t \leq T-1$.

Determining an index of the most likely final state according to $i^*_T = \arg\max_{i=1,\ldots,N}\{\delta_T(i)\}$, and backtracking the indexes $i^*_t = \phi_{t+1}(i^*_{t+1})$, for $t=1, 2, \ldots, T-1$.

Determining the most probable state sequence $S_{i^*_1}, S_{i^*_2}, \ldots, S_{i^*_T}$.

Baum-Welch Algorithm

The Baum-Welch algorithm, also known as forward-backward algorithm, estimates the optimal HMM parameters for a given observation sequence $x_1, x_2, \ldots, x_T$, and maximizes the probability of observation over all hidden Markov models, $\max_\lambda \Pr\{x_1, x_2, \ldots, x_T | \lambda\}$.

For a given HMM $\lambda=(A, B, \Pi)$, the probability of being in the state $S_i$ at time t and being in the state $S_j$ at the time t+1 is defined as a conditional probability $\zeta_t(i, j)$ according to $$\zeta_t(i,j) = \Pr\{q_t = S_i, q_{t+1} = S_j | x_1, x_2, \ldots, x_T, \lambda\}, \quad (8)$$

which is equal to $$\zeta_t(i, j) = \frac{\Pr\{q_t = S_i, q_{t+1} = S_j, x_1, x_2, \ldots, x_T | \lambda\}}{\Pr\{x_1, x_2, \ldots, x_T | \lambda\}}. \quad (9)$$

By employing the notations of $\alpha_t(i)$ and $\beta_t(i)$ defined in Equation (1) and Equation (3), a conditional probability $\zeta_t(i, j)$ is $$\zeta_t(i, j) = \frac{\alpha_t(i) a_{ij} \beta_{t+1}(j) b_j(x_{t+1})}{\Pr\{x_1, x_2, \ldots, x_T | \lambda\}}. \quad (10)$$

A total conditional probability $\gamma_t(i)$ of being in the state $S_i$ at time t is determined according to $$\gamma_t(i) = \sum_{j=1}^{N} \zeta_t(i,j)_{\text{for all}} 1 \leq i \leq N, 1 \leq t \leq T.$$

The Baum-Welch Algorithm updates, in the unsecure domain, the HMM $\lambda$ as follows:

Initializing a HMM $\lambda=(A, B, \Pi)$ randomly.

Determining an initial state probability vector based on an initial probability of the state according to $$\bar{\pi}_i = \gamma_1(i), 1 \leq i \leq N; \quad (11)$$

Determining transition probability according to $$\bar{a}_{ij} = \frac{\sum_{t=1}^{T-1} \zeta_t(i, j)}{\sum_{t=1}^{T-1} \gamma_t(i)}, 1 \leq i, j \leq N; \quad (12)$$

Determining, based on observation symbol of an alphabet $v_k$, probabilities of observations according to $$\bar{b}_j(v_k) = \frac{\sum_{t=1, x_t=v_k}^{T} \gamma_t(j)}{\sum_{t=1}^{T} \gamma_t(j)}, 1 \leq j \leq N, 1 \leq k \leq M. \quad (13)$$

Determining the probability of the observation sequence with respect to updated HMM according to
$\Pr\{x_1, x_2, \ldots, x_T | \bar{\lambda}\}$ where $\bar{\lambda} = (\bar{A}, \bar{B}, \bar{\Pi})$; and If $\Pr\{x_1, x_2, \ldots, x_T | \bar{\lambda}\} - \Pr\{x_1, x_2, \ldots, x_T | \lambda\} \leq D$, where D is a pre-described threshold, then stop and select the parameters of the HMM as final parameters. Otherwise, update the HMM $\lambda$ with the HMM $\bar{\lambda}$ and go back to step 2.

Accordingly, there is a need in the art to determine the forward, the backward, the Viterbi and the Baum-Welch algorithms in a secure domain.

SUMMARY OF THE INVENTION

It is an object of the embodiments of the invention to provide a method for privacy-preserving probabilistic inference.

It is an object of the invention to provide forward, backward, Viterbi and Baum-Welch methods in a secure domain.

It is further object of the invention to provide such method that is suitable for applications where a client computer encrypts data and transmits the encrypted data to a server computer, and the server performs most of the computationally intensive tasks.

Some embodiments of the invention are based on a realization that privacy-preserving computation between the server and the client for secure probabilistic inference based on hidden Markov models can be performed in an asynchronous manner using properties of additive homomorphism.

Accordingly, one embodiment discloses a method for determining parameters of a hidden Markov model (HMM) stored at a server based on an observation sequence stored at a client, wherein the client has a decryption key and an encryption key of an additively homomorphic cryptosystem, and the server has only the encryption key, including: initializing parameters of the HMM; determining an encryption of a probability of the observation sequence with respect to the parameters of the HMM using an H-SMC, wherein the H-SMC includes a secure multiparty computation (SMC) between the server and the client using at least one property of additive homomorphism; determining, for each state of the HMM, an encrypted forward probability of the observation sequence with respect to the parameters of the HMM using the SMC; determining, for each state of the HMM, an encrypted backward probability of the observation sequence using the H-SMC; determining, for each element of the observation sequence, an encrypted conditional joint probability of each pair of states given the parameters of the HMM to produce a set of encrypted conditional joint probabilities, wherein the determining is based on the encryption of the log-probability of the observation sequence, the encrypted forward probability, and the encrypted backward probability, wherein the determining is performed in encrypted domain using at least one property of additive homomorphism; and updating, using the H-SMC having as input the set of encrypted conditional joint probabilities, the parameters of the HMM.

The determining the encryption of the probability of the observation sequence, the determining the encrypted forward probability, the determining the encrypted backward probability, the determining the encrypted conditional joint probability, and the updating the parameters can be repeated iteratively until a difference between the probability of the observation sequence of a current iteration and the probability of the observation sequence of a previous iteration is above a threshold.

Another embodiment discloses a method for determining parameters of a hidden Markov model (HMM) stored at a server based on an observation sequence stored at a client, wherein the client has a decryption key and an encryption key of an additively homomorphic cryptosystem, and the server has only the encryption key, including: initializing parameters of the HMM; and updating the parameters iteratively until a difference between a probability of the observation sequence of a current iteration and a probability of the observation sequence of a previous iteration is above a threshold, wherein, for each iteration, the parameters are updated based on an encrypted conditional joint probability of each pair of states given the observation sequence and the parameters of the HMM, wherein the encrypted conditional probability is determining in an encrypted domain using a secure multiparty computation (SMC) between the server and the client, wherein steps of the method are performed by the server.

Yet another embodiment discloses a server for determining parameters of a hidden Markov model (HMM) based on an observation sequence stored at a client, wherein the client has a decryption key and an encryption key of an additively homomorphic cryptosystem, and the server has only the encryption key, comprising a processor configured for: initializing parameters of the HMM; updating the parameters iteratively until a difference between a probability of the observation sequence of a current iteration and a probability of the observation sequence of a previous iteration is above a threshold, wherein, for each iteration, the parameters are updated based on an encrypted conditional joint probability of each pair of states given the observation sequence and the parameters of the HMM, wherein the encrypted conditional probability is determining in an encrypted domain using an H-SMC, wherein the H-SMC includes a secure multiparty computation (SMC) between the server and the client using at least one property of additive homomorphism.

BRIEF DESCRIPTION OF THE DRAWINGS

FIGS. 7A, 7B, 7C, 7D, and 7E are block diagrams and pseudo codes of various embodiments of an H-Forward method;

FIGS. 8A-8B are block diagrams and pseudo codes of various embodiments of an H-Backward method;

FIGS. 9A-9B are block diagrams and pseudo codes of various embodiments of an H-Viterbi method; and FIGS. 10A, 10B, 10C, 10D, 10E and 10F are block diagrams and pseudo codes of various embodiments of an H-Baum-Welch method.

DETAILED DESCRIPTION OF THE PREFERRED EMBODIMENT

System Overview

Figure 1:
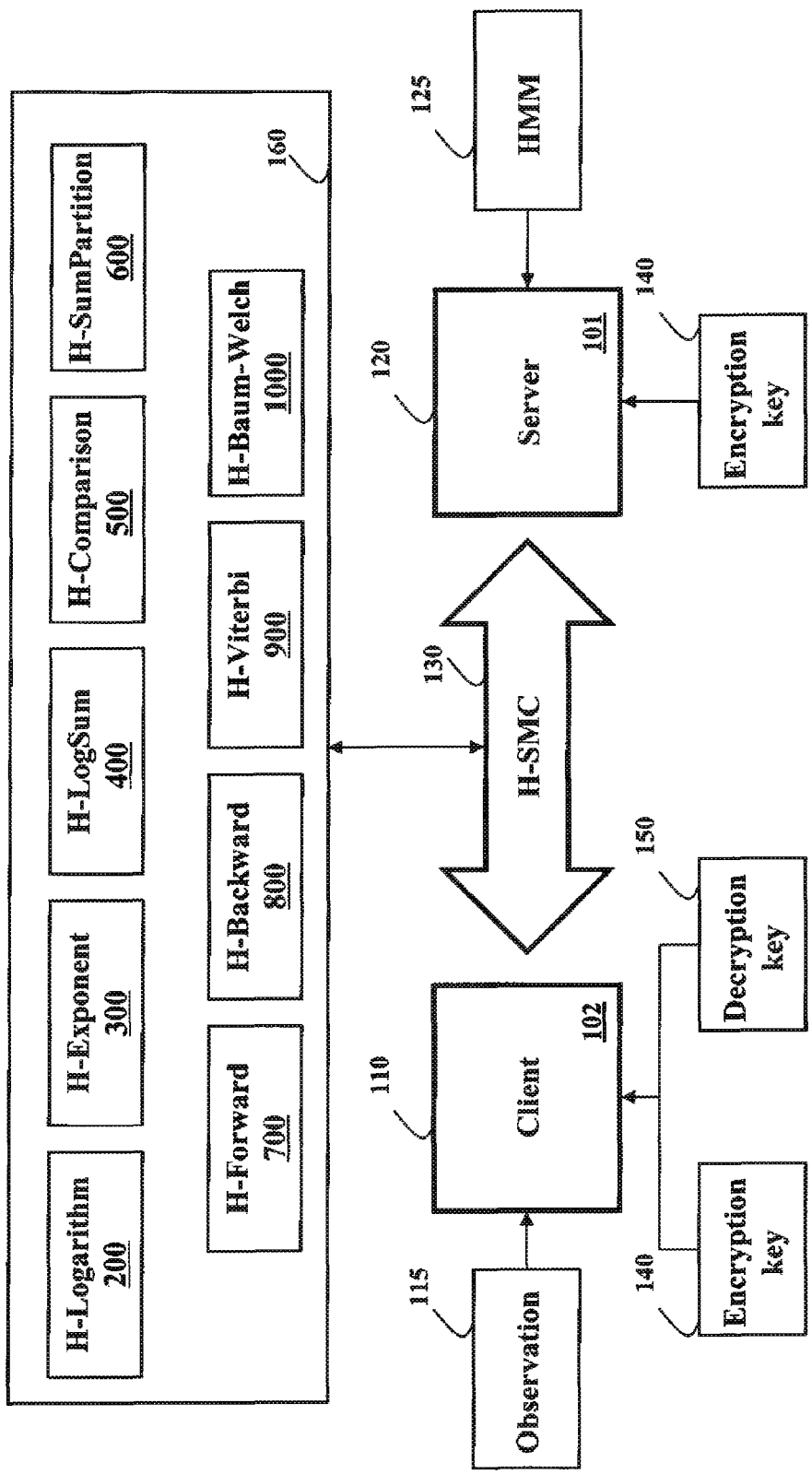
FIG. 1 shows a block diagram of a system in accordance with some embodiments of invention.

FIG. 1 shows a system 100 employing some embodiments of the invention. A client 110 stores an observation sequence 115. A server 120 stores a hidden Markov model (HMM) 125. The client also stores a decryption key 150 and an encryption key 140 for an additively homomorphic cryptosystem. The server has only the encryption key 140.

The client and the server perform a secure multiparty computation (SMC) using at least one property of additive homomorphism, i.e., an H-SMC, to determine a secure probabilistic inference of the observation sequence with respect to the HMM. As referred herein, a prefix "H-" indicates that a communication, a computation, or a method is performed in a secure domain using at least one property of additive homomorphism. For example, the H-SMC 130 can use at least one H-method 160, as described in more details below. The client and the server can be implemented using a processor, such as a processor 101 and/or a processor 102.

Additively Homomorphic Cryptosystem

For any two messages $m_1$, $m_2$ and an additive homomorphic encryption function $\xi(\cdot)$, the additive homomorphic property ensures that $\xi(m_1+m_2)=\xi(m_1)\xi(m_2)$. Because of this property, some operations can be performed directly on the encrypted message (ciphertext), enabling some manipulations on the underlying unencrypted messages (plaintext). The embodiments of the invention can use any additively homomorphic cryptosystem. For example, one embodiment uses the Paillier cryptosystem described below.

Configuration: Select two large prime numbers p, q, such that N=pq. Denote by $Z^*_{N^2} \subset Z_{N^2}=\{0, 1, \ldots, N^2-1\}$ a set of non-negative integers that have multiplicative inverses modulo $N^2$. Select $g \in Z^*_{N^2}$ such that $\gcd(L(g^\lambda \bmod N^2), N)=1$, where $\lambda=1 \text{ cm}(p-1, q-1)$ and $$L(x) = \frac{x-1}{N} \cdot \text{Let } (N, g)$$

be the encryption key, and (p, q) be the decryption key.

Encryption: Let $m \in Z_N$ be a plaintext. Then, the ciphertext is given by $$\xi_r(m) = g^m \cdot r^N \bmod N^2$$

where $r \in Z^*_N$ is a number selected at random.

Decryption: Let $c \in Z_{N^2}$ be the ciphertext. Then, the corresponding plaintext is given by $$\psi(\xi_r(m)) = \frac{L(c^\lambda \bmod N^2)}{L(g^\lambda \bmod N^2)} = m \bmod N.$$

In the additively homomorphic cryptosystem, the decryption works irrespective of the value of r used during encryption. Because r is selected at random for every encryption, the Paillier cryptosystem is probabilistic, and semantically secure, i.e., repeated encryptions of the same plaintext result in different ciphertexts.

In addition, the additive homomorphism includes the following properties.

$$\psi(\xi_{r_1}(m_1)\xi_{r_2}(m_2) \bmod N^2) = m_1 + m_2 \bmod N, \text{ and}$$

$$\psi([\xi_r(m_1)]^{m_2} \bmod N^2) = m_1 m_2 \bmod N$$

wherein $r_1, r_2 \in Z^*_N$ and $r_1 \neq r_2$ in general. For clarity, the rest of the disclosure omits the subscripted random parameter.

Oblivious Transfer

Some embodiments of the invention use 1-of-n oblivious transfer (OT).

For example, the server may have n messages $m_1, m_2, \ldots m_n$ and the client may have an index $1 \leq i \leq n$. The OT is a method to accomplish the following: the client determined the message $m_i$ but discovers nothing about the other messages, and the server does not discover the index i. The OT can be implemented in many known ways. The OT is a sufficient primitive, i.e., can be used for secure evaluation of any function, provided that function can be represented as an algebraic circuit. However, evaluating general functions using only OT is complex in terms of computation and data transfer.

H-Methods

Various embodiments of the invention use at least one or combination of H-methods 160 described below. In all H-methods, the client has the decryption key and the encryption key of the additively homomorphic cryptosystem, e.g., key pair for the Paillier encryption function $\xi(\cdot)$. The server has only the encryption key. The H-methods are based on H-SMC using at least one property of additive homomorphism. For the clarity of this description, in all calculations involving logarithms, a base of the logarithm is $g \in Z^*_{N^2}$, which is the parameter used for the Paillier encryption. To avoid notational clutter, the base of the logarithm is not explicitly shown.

Secure H-Logarithm Method

Figure 2:
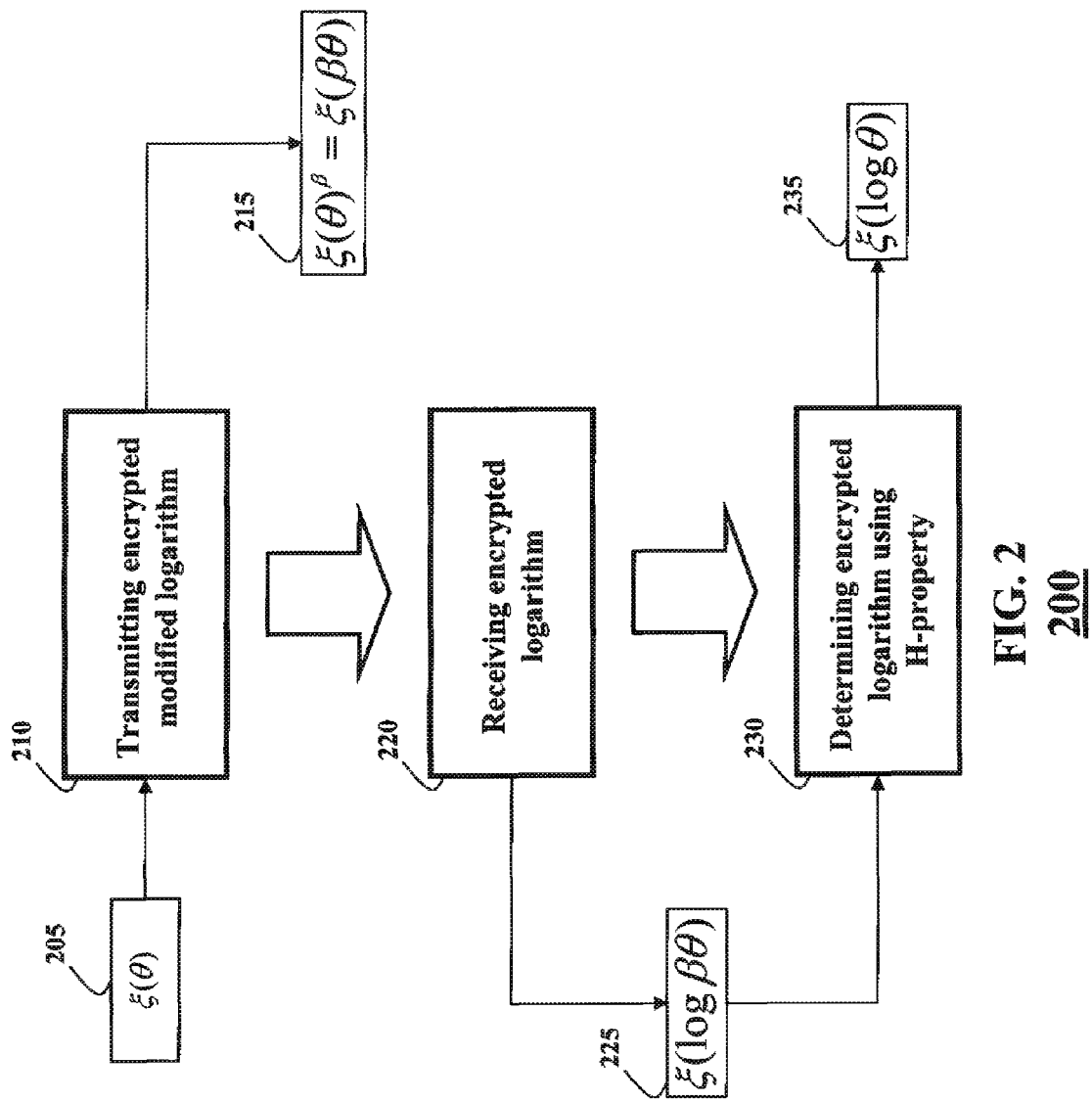
FIG. 2 is a block diagram of an H-Logarithm method in accordance with some embodiments of invention.

FIG. 2 shows a flow chart of an H-Logarithm method 200. An input to the method is encrypted variable $\xi(\theta)$ 205 stored at the server. At the output, the server determines an encryption $\xi(\log \theta)$ 235 of a logarithm of the encrypted variable $\theta$. The client obtains no information about the variable $\theta$.

The server randomly selects an integer $\beta$, and transmits 210 an encrypted modified variable 215 $\xi(\theta)^\beta = \xi(\beta\theta)$ to the client. The client decrypts $\beta\theta$ and processes the modified variable, such that the server receives 220 an encrypted logarithm of the modified variable $\xi(\log \beta\theta)$ 225.

The servers determines 230 an encrypted logarithm 235 of the variable using H-property, i.e., a property of additive homomorphism according to $$\xi(\log \beta\theta) \cdot \xi(-\log \beta) = \xi(\log \theta + \log \beta) \cdot \xi(-\log \beta) = \xi(\log \theta)$$

In some embodiments, the logarithms $\log \beta$ and $\log \beta\theta$ are not integers and the embodiments use integer approximations. For example, the sever receives from the client $\xi(\lfloor L \log \beta\theta \rfloor)$, where L is a large integer, e.g., $L=10^6$. Every multiplication by the integer L is compensated by a corresponding division at every decryption. In some embodiments, the integer approximation is used by various H-methods.

In this example, the H-method is accurate to six decimal places. Similarly, the server determines $$\xi(\lfloor L \log \beta\theta \rfloor) \xi(-\lfloor L \log \beta \rfloor) = \xi(\lfloor L \log \beta + L \log \theta \rfloor - \lfloor L \log \beta \rfloor).$$

Secure H-Exponent Method

Figure 3:
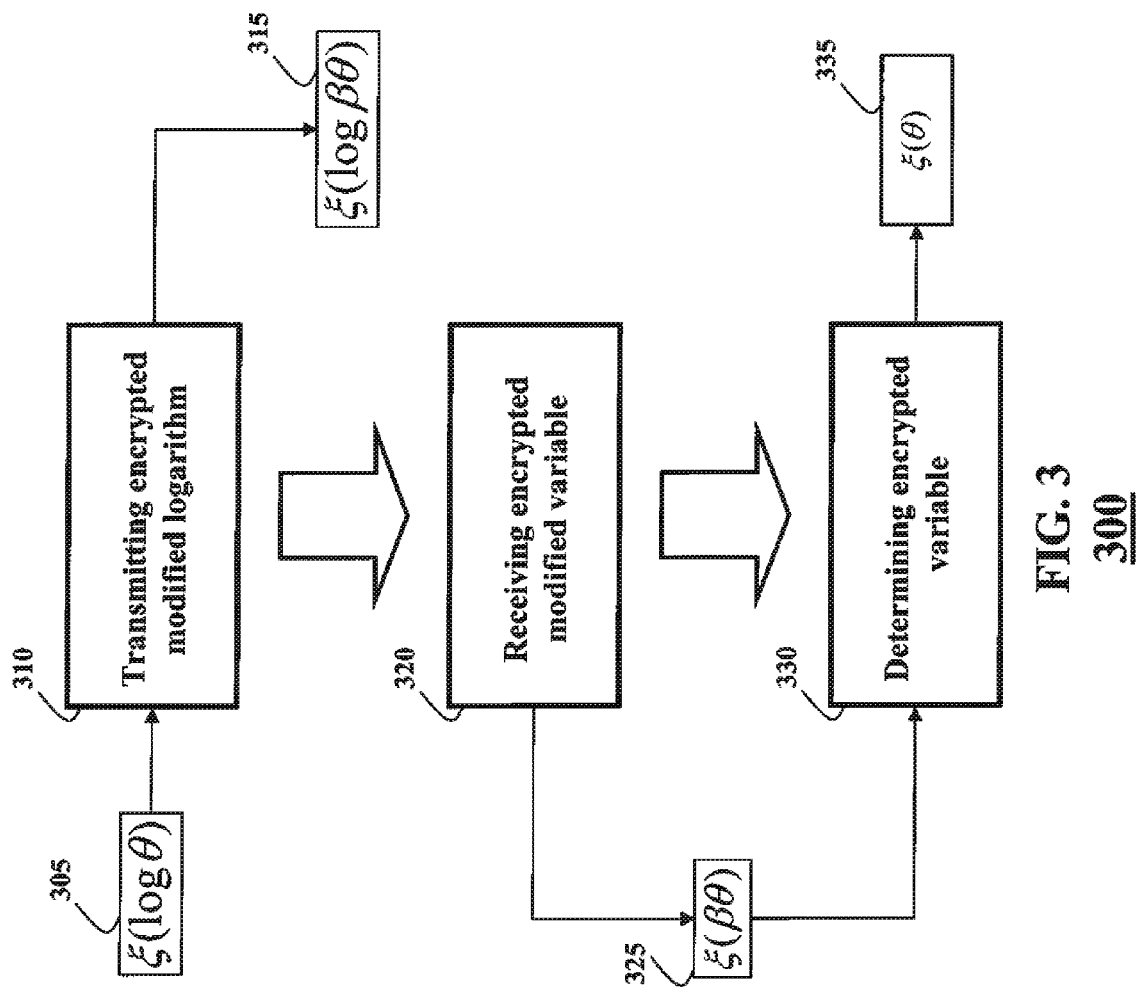
FIG. 3 is a block diagram of an H-Exponent method in accordance with some embodiments of invention.

FIG. 3 shows a flow chart of an H-Exponent method 300. An input to the method is encrypted logarithm $\xi(\log \theta)$ 305 stored at the server. At the output, the server determines an encryption of the variable $\xi(\theta)$ 335, and the client obtains no information about the variable $\theta$.

The server randomly selects an integer $\beta$, and transmits 310 an encrypted modified logarithm 315 to the client according to $$\xi(\log \theta)\xi(\log \beta) = \xi(\log \theta + \log \beta) = \xi(\log \beta\theta).$$

The client decrypts the encrypted logarithm to receive a logarithm $\log \beta\theta$ and process the logarithm, such that the server receives 320 an encrypted modified variable $\xi(\beta\theta)$ 325. The server determines 330 the encrypted variable 335 according to $$\xi(\beta\theta)^{\frac{1}{\beta}} = \xi(\theta),$$

wherein $$\frac{1}{\beta}$$

is the multiplicative inverse of the integer $\beta$ in $Z^*_{N^2}$.

Secure H-LogSum Method

Figure 4:
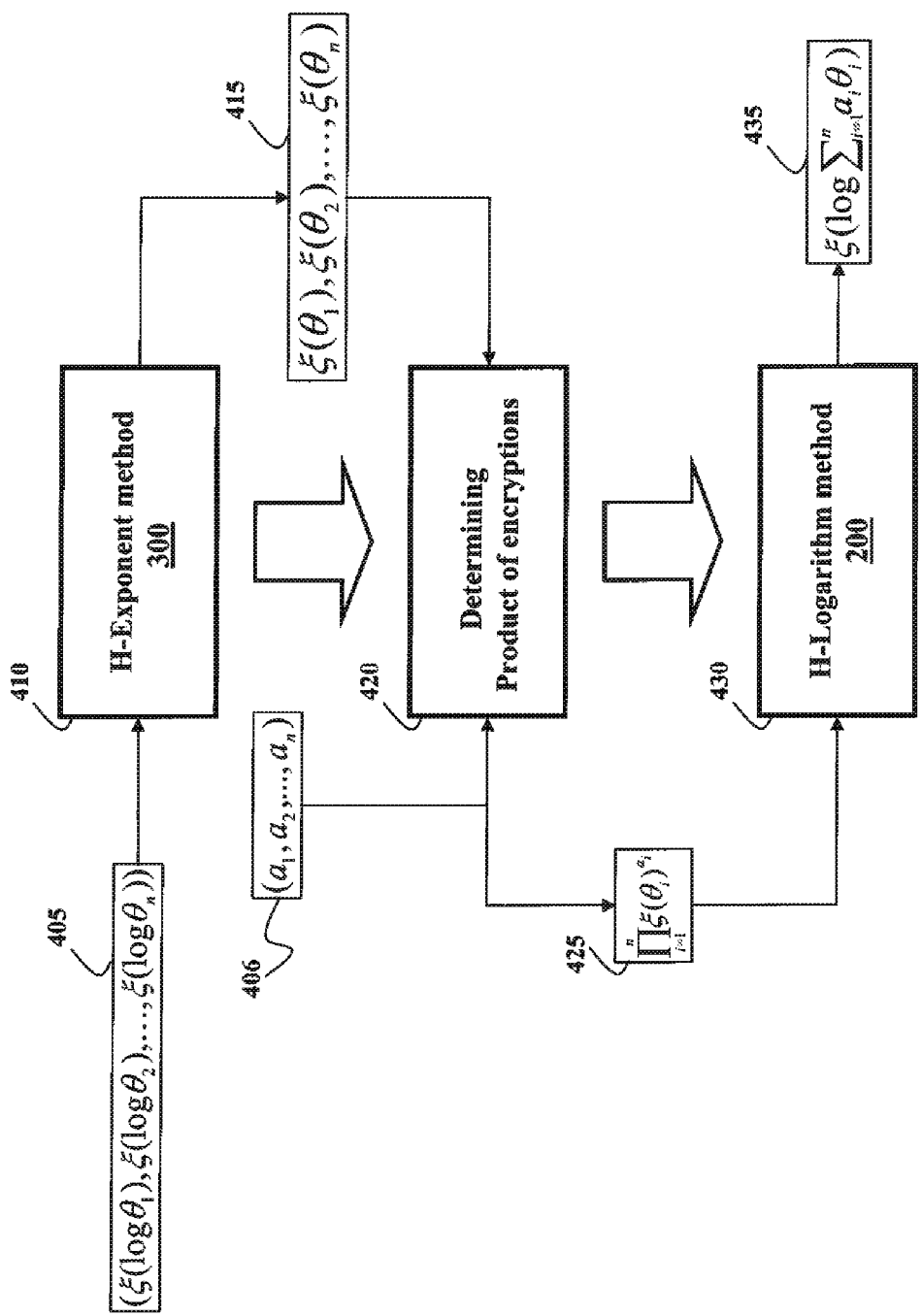
FIG. 4 is a block diagram of an H-LogSum method in accordance with some embodiments of invention.

FIG. 4 shows a flow chart of an H-LogSum method 400. An input to the method is a set of encrypted logarithms $(\xi(\log \theta_1), \xi(\log \theta_2), \ldots, \xi(\log \theta_n))$ 405 and a constant vector $(\alpha_1, \alpha_2, \ldots, \alpha_n)$ 406 stored at the server. At the output, the server determines an encryption of log-summation $$\xi\left(\log \sum_{i=1}^n a_i \theta_i\right)_{435,}$$

and the client determines no information about the variables $\theta_i$ and $\alpha_i$.

The server and the client execute 410 the H-Exponent method 300 having as input the set of encrypted logarithms 405 such that the server determines a set of encrypted variables 415

$$\xi(\theta_1), \xi(\theta_2), \ldots, \xi(\theta_n).$$

The server uses H-property to determine 420 a product 425 of the encrypted variables in a power of elements of the constant vector according to $$\xi\left(\sum_{i=1}^n a_i \theta_i\right) = \prod_{i=1}^n \xi(a_i \theta_i) = \prod_{i=1}^n \xi(\theta_i)^{a_i}.$$

The server and the client execute 430 the H-Logarithm method 200, to determine the encryption of log-summation $$\xi\left(\log \sum_{i=1}^{n} a_i \theta_i\right) 435.$$

Secure H-Comparison Method

Figure 5:
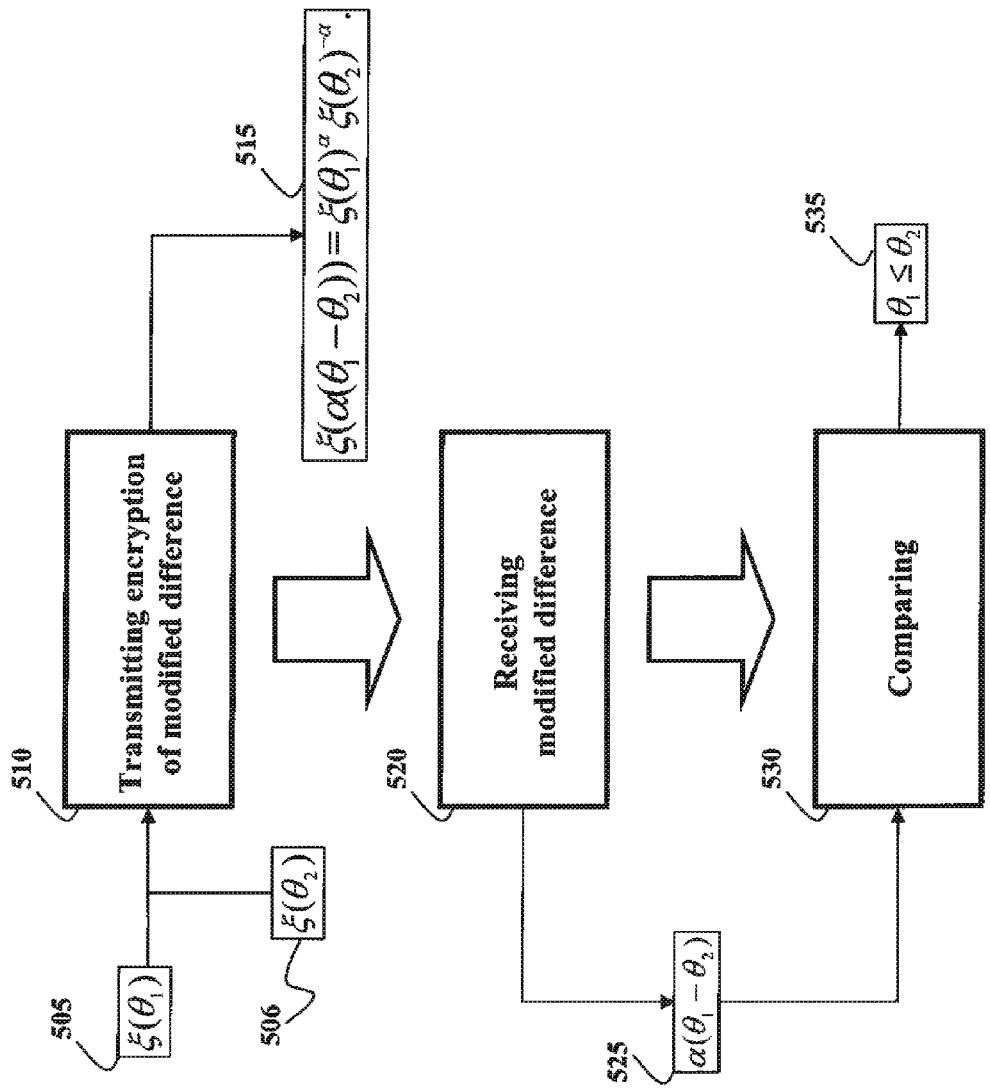
FIG. 5 is a block diagram of an H-Comparison method in accordance with some embodiments of invention.

FIG. 5 shows a flow chart of an H-Comparison method 500. An input to the method is at least two encrypted variables stored at the server, e.g., an encryption of a first variable $\xi(\theta_1)$ 505 and an encryption of a second variable $\xi(\theta_2)$ 506. At the output, the server determines whether $\theta_1 \leq \theta_2$ 535, and the client determines no information about the variables $\theta_1$ and $\theta_2$.

The server randomly selects a positive or a negative integer $\alpha$, and transmits 510 to the client an encryption of modified difference 515 according to $$\xi(\alpha(\theta_1-\theta_2)) = \xi(\theta_1)^\alpha \xi(\theta_2)^{-\alpha}.$$

The client decrypts and receives the modified difference $\alpha(\theta_1-\theta_2)$ 525 and transmits the modified difference back to the server. The server receives 520 the modified difference 525 and comparing 530 whether $\theta_1 \leq \theta_2$, based on the sign of the integer $\alpha$.

Secure H-SumPartition Method

Figure 6:
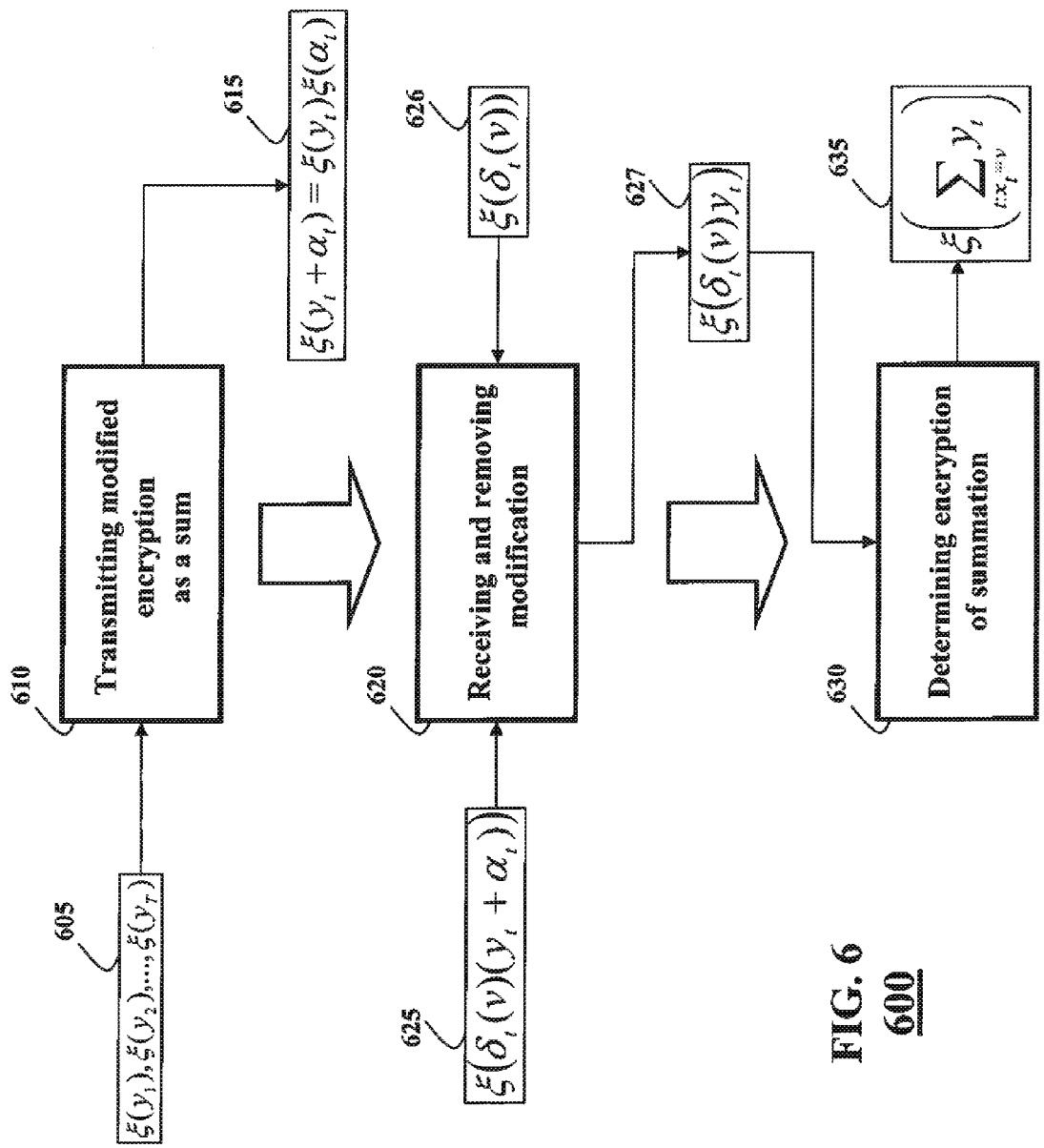
FIG. 6 is a block diagram of an H-SumPartition method in accordance with some embodiments of invention.

FIG. 6 shows a flow chart of an H-SumPartition method 600. An input to the method is a sequence of elements $x_1, x_2, \ldots, x_T$ stored at the client. Each element $x_t$ is selected from an alphabet $V = \{v_1, v_2, \ldots, v_M\}$. Also, the input to the method is a sequence of encryptions of variables $\xi(\gamma_1), \xi(\gamma_2), \ldots, \xi(\gamma_T)$ 605 stored at the server. The server and the client have a common element $v \in V$. At the output, the server determines an encryption of a summation $$\sum_{t:x_t=v} y_t 635,$$

$t=1, 2, \ldots, T$, such that the server determines nothing about the sequence of the elements, and the client determines nothing about the sequence of encryptions.

The server, for each encryption $\xi(\gamma_t)$, randomly selects an integer $\alpha_t$, and transmits 610 to the client a modified encryption as a sum 615 according to $$\xi(\gamma_t+\alpha_t) = \xi(\gamma_t)\xi(\alpha_t).$$

The client decrypts the sum, determines an encryption of a product of the sum $\xi(\delta_t(v)(\gamma_t+\alpha_t))$ 625 and an encryption of an indicator sequence $\xi(\delta_t(v))$ 626, and transmits the encryptions 625 and 626 to the server, wherein the indicator sequence $\delta_t(v)$ of $x_1, x_2, \ldots, x_T$, for the common element $v$, is determined according to $\delta_t(v)=1$ if $x_t=v$ and $\delta_t(v)=0$ if $x_t \neq v$.

The server receives 620 the encryption of the product 625 and the encryption of the indicator sequence 626 and removes the modification to determine an encryption of a product 627 of a variable $\gamma_t$ and the indicator sequence according to $$\xi(\delta_t(v)(\gamma_t+\alpha_t)) \cdot \xi(-\delta_t(v)\alpha_t) = \xi(\delta_t(v)\gamma_t)$$

Next, the server determines 630 an encryption of the summation $$\sum_{t:x_t=v} y_t 635$$

according to $$\xi\left(\sum_{t:x_t=v} y_t\right) = \xi\left(\sum_t \delta_t(v)y_t\right) = \prod_{t=1}^{T} \xi(\delta_t(v)y_t).$$

Secure H-Forward Method

Figure 7A:
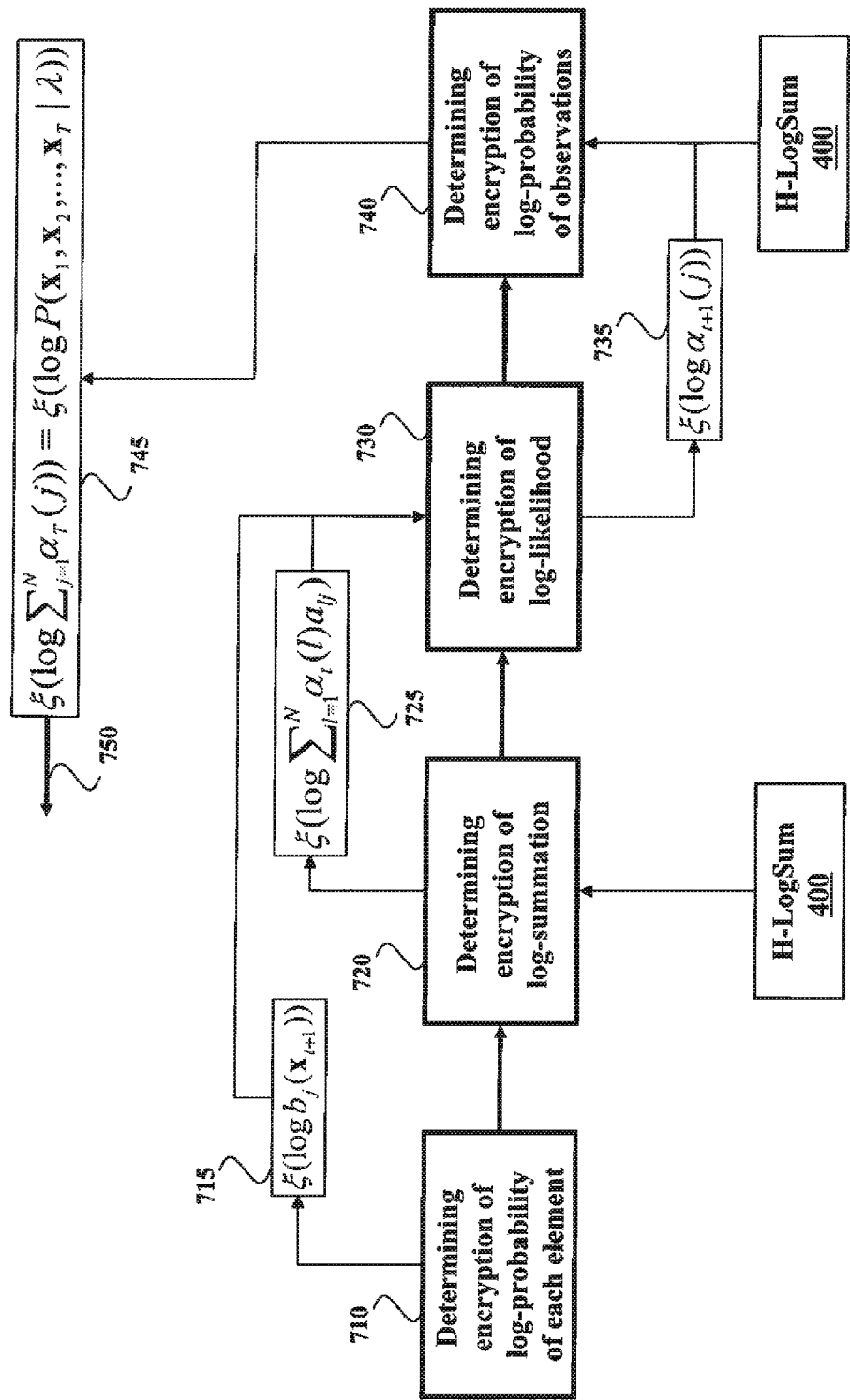

FIG. 7A shows a flow chart of an H-Forward method 700 according to some embodiments of the invention. The method 700 is suitable for evaluating a probability of an observation sequence stored at a client, e.g., the client 110, with respect to a HMM stored at a server, e.g., the server 120. According to the embodiments the client has a decryption key and an encryption key of an additively homomorphic cryptosystem, and the server has only the encryption key.

The method is described based on the steps performed by the server. However, at least one step of the method includes the H-SMC between the server and the client. Various steps of the method are performed iteratively for each state of the HMM and/or for each observation in the observation sequence $x_1, x_2, \ldots, x_T$. At an output of the method, the server determines an encryption of the log-probability of the observation sequence according to $\xi(\log \Pr\{x_1, x_2, \ldots, x_T | \lambda\})$.

The HMM $\lambda$ is defined, e.g., according to $\lambda = (A, B, \Pi)$, wherein $A = (\alpha_{ij})$ is a state transition matrix, $\alpha_{ij}$ is a transition probability from a state $S_i$ to a state $S_j$, wherein $1 \leq i, j \leq N$, and N is a number of states of the HMM, wherein $B = (b_1, b_2, \ldots, b_N)$ is a matrix of probabilities of observations, $b_j$ is a column vector of the matrix of probabilities over alphabet of the observation sequence, $j=1, 2, \ldots, N$, wherein $\Pi = (\pi_1, \pi_2, \ldots, \pi_N)$ is an initial state probability vector of the HMM.

The server determines 710, for each state of the HMM, an encryption of a log-probability 715 of a current element of the observation sequence. For example, the encryption of the log-probability can be determined according to $$\xi(\log b_j(x_{t+1})),$$

wherein $x_{t+1}$ is the current element of the observation sequence, $\xi(\cdot)$ is an encryption function of the additively homomorphic cryptosystem.

Also, the server determines determining 720, for each state of the HMM, an encryption of a log-summation 725 of a product of a likelihood of the observation sequence based on a previous element of the observation sequence and a transition probability to the state of the HMM. The log-summation can be determined using an H-SMC, wherein the H-SMC includes a secure multiparty computation using at least one property of additive homomorphism. For example, one embodiment uses the H-LogSum method 400.

For example, some embodiments determine the encryption of the log-summation according to $$\xi\left(\log \sum_{l=1}^{N} \alpha_t(l) a_{lj}\right),$$

wherein $l$ is an index of a state $S_l$, $l=1, 2, \ldots, N$, wherein $\alpha_t(l)$ is the likelihood of the observation sequence of the previous element $x_t$ at a state $S_l$, and $\alpha_{lj}$ is the transition probability from the state $S_l$ to the state $S_j$ of the HMM.

One embodiment initializes the encryption of the log-summation according to))

$$\xi(\log \alpha_1(j)) = \xi(\log \pi_j) \cdot \xi(\log b_j(x_1))$$

for $j=1, 2, \ldots, N$.

The server determines 730 an encryption of a log-likelihood of the observation sequence 735 for each state as a product of the encryption of a log-summation and an encryption of a corresponding log-probability of the current element of the observation sequence.

For example, one embodiment determines the encryption of the log-likelihood of the observation sequence $\xi(\log \alpha_{t+1}(j))$ based on the property of additive homomorphism according to $$\xi(\log \alpha_{t+1}(j)) = \xi\left(\log \sum_{l=1}^{N} \alpha_t(l) a_{lj}\right) \cdot \xi(\log b_j(x_{t+1}))$$

An encryption of the log-probability of the observation sequence 745 is determined 740 based on the log-likelihood of the observation sequence for each state according to $$\xi\left(\log \sum_{j=1}^{N} \alpha_T(j)\right) = \xi(\log P(x_1, x_2, \ldots, x_T \mid \lambda)).$$

For example, one embodiment determines the encryption of the log-probability of the observation sequence using an H-LogSum method having as an input the log-likelihood of the observation sequence for each state. The encryption of the log-probability of the observation sequence can be stored in a memory (not shown) and/or transmitted 750 to the client.

Figure 7B:
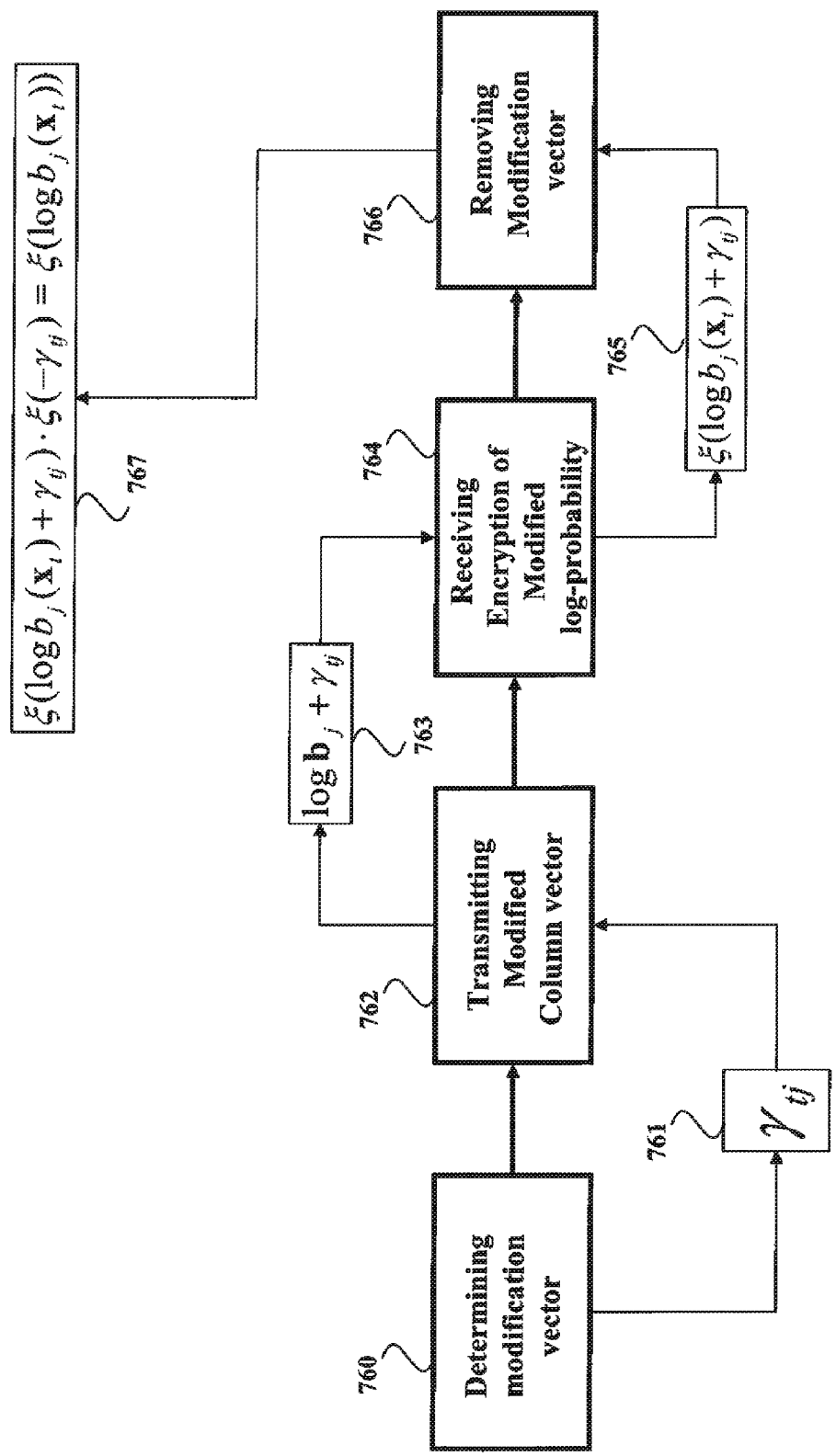

FIG. 7B shows a flow chart of a method in accordance with one embodiment for determining the encryption of the log-probability of the current element of the observation sequence using 1-of-M oblivious transfer.

The server determines 760 a modification vector $\gamma_{tj}$ 761. For example, in one embodiment, the modification vector is generated randomly. A column vector $\log b_j + \gamma_{tj}$ 763 of log-probabilities of an alphabet of the observation sequence modified with the modification vector is transmitted 762 to the client. After the client determined $\log b_j(x_t) + \gamma_{tj}$ using 1-of-M OT, the server receives 764 the encryption 765 of the log-probability of each element of the observation sequence modified with the modification vector and removes 766 the modification vector to produce the encryption of the log-probability 715 of each element.

For example, the server receives $\xi(\log b_j(x_t) + \gamma_{tj})$ and determines the encryption of the log-probability $\xi(\log b_j(x_t))$ of each element $x_t$ according to $\xi(\log b_j(x_t) + \gamma_{tj}) \cdot \xi(-\gamma_{tj})$.

For illustration purpose only, FIG. 7C shows a pseudo code 768 of one embodiment of the H-Forward method. This pseudo code is also described in Appendix A.

Secure Keyword Recognition

Some embodiments of the invention use the H-Forward method for privacy-preserving keyword recognition. In these embodiments the observation sequence includes a sampled speech signal. Typically, the client converts the speech signal into T frames, where each frame is represented by a d-dimensional vector of mel frequency cepstral coefficients (MFCCs), e.g., d=39. Derivation of MFCCs from speech signals is known. Thus, the client stores $x_t$, t=1, 2, . . . , T where each $x_t \in R^d$.

The server stores a set of a size $\Delta$ of different HMMs. Each HMM is trained for a single keyword. The H-Forward method of this embodiment determines the keyword that is most likely to be contained in the speech signal.

At the state $S_j$ the d-dimensional vector $x_t$ of MFCCs has a multivariate Gaussian distribution with the mean vector $\mu_j$ and covariance matrix $C_j$, i.e., $b_j(x_t) = N(\mu_j, C_j)$, where j=1, 2, . . . , N indexes the state of the HMM $\lambda$. If an observation vector $z_t = [x_t^T, 1]^T$, then, $\log b_j(x_t) = z_t^T W_j z_t$, $z_t = [x_t^T, 1]^T$, wherein T is a transpose operator, j is $1 \leq j \leq N$, and N is a number of states of the HMM, $W_j$ is a matrix of the multivariate Gaussian distribution according to $$W_j = \begin{bmatrix} -\frac{1}{2} C_j^{-j} & C_j^{-1} \mu_j \\ 0 & w_j \end{bmatrix} \in R^{(d+1) \times (d+1)} \text{ and}$$

$$w_j = \frac{1}{2} \mu_j^T C_j^{-1} \mu_j - \frac{1}{2} \log|C_j^{-1}| - \frac{d}{2} \log 2\pi.$$

In this embodiment, the vector $x_t$ t is a single multivariate Gaussian random variable, though an extension to mixture of multivariate Gaussians is also within the scope of the invention. The matrix $W_j$ is stored at the server. Further, the log-probability $\log b_j(x_t)$ is a linear function of products $z_m^{(t)} z_n^{(t)}$, where $z_m^{(t)}$, $z_n^{(t)}$ are elements of the vector $z_t$, m, n$\in \{1, 2, \ldots, d+1\}$.

Figure 7D:
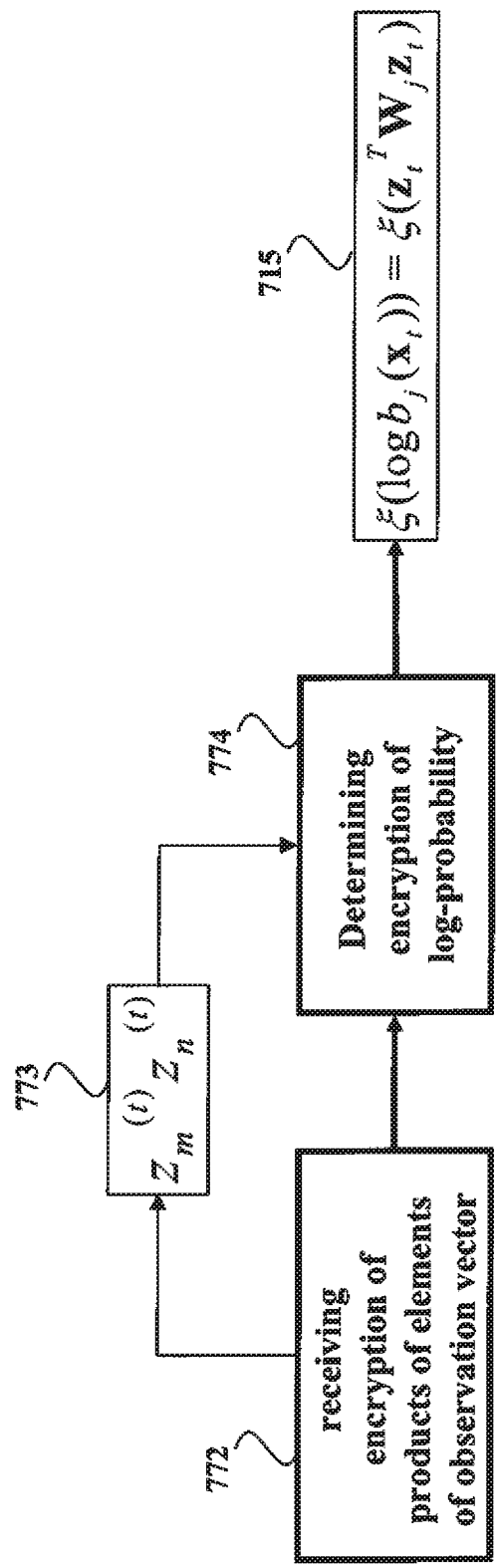

As shown in FIG. 7D, this embodiment determines 774, in response to receiving 772 an encryption of products $z_m^{(t)} z_n^{(t)}$ 773 of elements of the observation vector, the encryption of the log-probability $\xi(\log b_j(x_t))$ 715 according to $$\xi(\log b_j(x_t)) = \xi(z_t^T W_j z_t)$$

using at least one property of an additive homomorphism, wherein $z_m^{(t)}$, $z_n^{(t)}$ are elements of the observation vector $z_t$, m, n$\in \{1, 2, \ldots, d+1\}$.

Figure 7E:
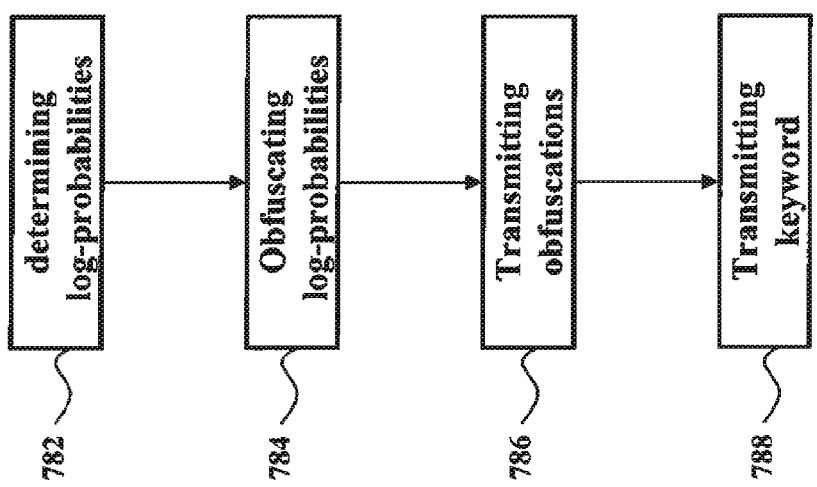

FIG. 7E shows a flow chart of a method for secure keyword recognition according to some embodiments of the invention. The log-probabilities of the observation sequence for each HMM stored at the server are determined 782 to produce a set of encrypted log-probabilities. The log-probabilities are determined using any implementation of the H-Forward, such that the server determines $$\xi(p_\delta) = \xi(\log Pr\{x_1, x_2, \ldots, x_T \mid \lambda_\delta\}), \delta = 1, 2, \ldots, \Delta.$$

The server obfuscates 784 the set of log-probabilities with an order-preserving matrix to produce an obfuscated set of encrypted log-probabilities. For example, the server determines an order-preserving matrix $R = (r_{ij})_{\Delta \times \Delta}$. Using the property of additive homomorphism, the server determines an element-wise encryption of obfuscations according to $(\xi(p'_1), \ldots, \xi(p'_\Delta)) = (\xi(p_1), \ldots, \xi(p_\Delta)) \cdot R$.

The server transmits 786 the obfuscated set of log-probabilities to the client and transmits 788 to the client a keyword of the HMM corresponding to a particular log-probability selected by the client based on the obfuscated set of log-probabilities. For example, the client, because R is order-preserving mapping, can decrypt and determine a maximum probability of the observation sequence with respect to each HMM according to $\delta^* = \max_\delta p'_\delta = \max_\delta p_\delta$. The server can transmit the keyword corresponding to the maximum probability using the oblivious transfer method.

Secure H-Backward Method

Figure 8A:
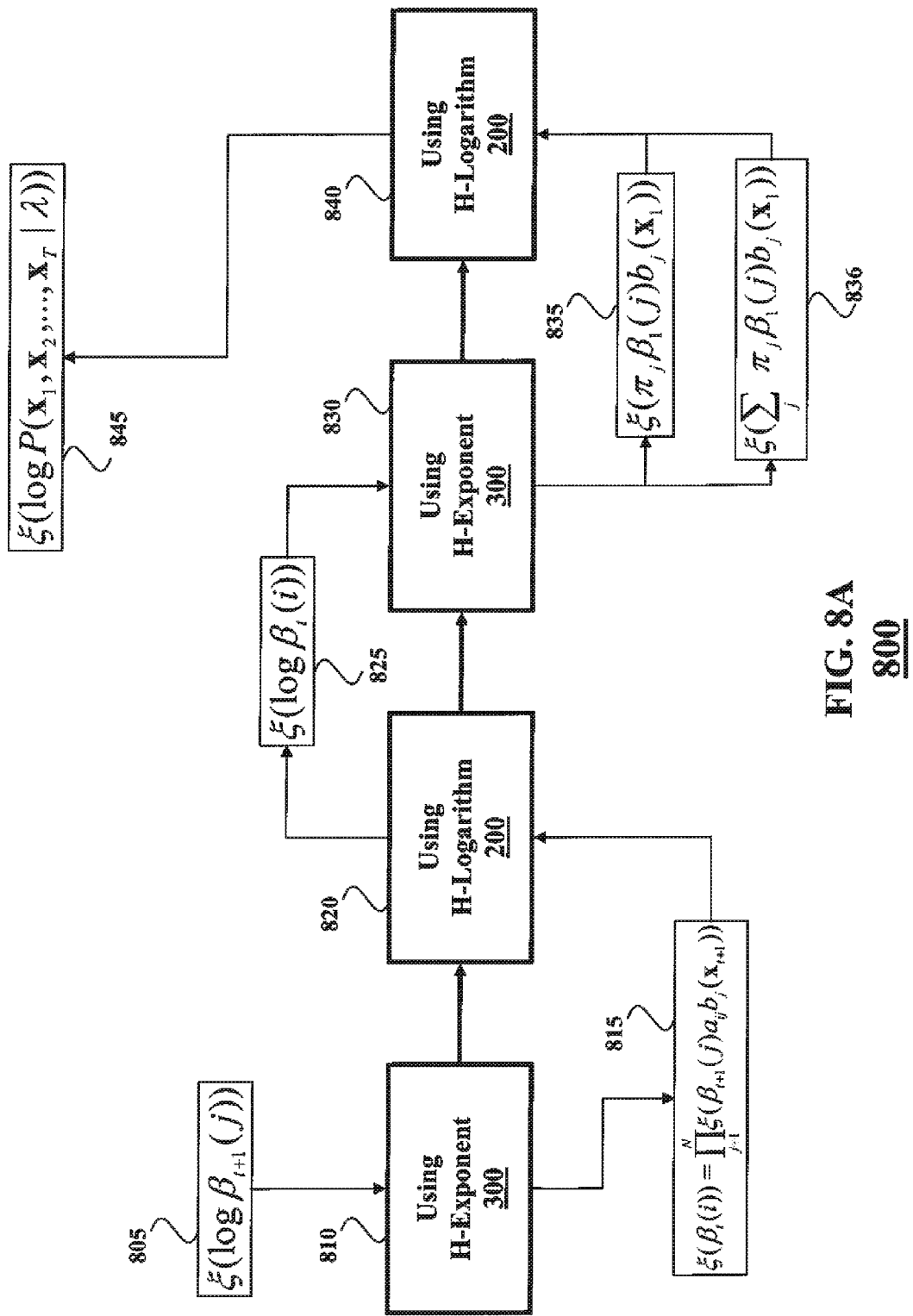

FIG. 8A shows a flow chart of an H-Backward method 800 for deter mining probability of the observation sequence according to some embodiments of the invention. The server, based on an encryption of a backward probability 805 of a current element of the observation sequence, determines 810, using the H-Exponent method, an encrypted backward probability 815 of the observation sequence according to $$\xi(\beta_t(i)) = \xi\left(\sum_{j=1}^{N} \beta_{t+1}(j) a_{ij} b_j(x_{t+1})\right) = \prod_{j=1}^{N} \xi(\beta_{t+1}(j) a_{ij} b_j(x_{t+1})). \quad (14)$$

Using the H-Logarithm method, the server determines 820 the encryption of log-backward probability ξ(log β$_t$)i)) 825. The server determines the encryption of log-backward probability recursively for each state of the HMM, until the server determines ξ(log β$_1$(i)).

Using the property of additive homomorphism and the H-Exponent method, the server determines 830 an encryption of the joint probability of the observation sequence and the initial state S$_j$, ξ(π$_j$β$_1$(j)b$_j$(x$_1$)) 835 and an encryption of the probability of the observation sequence $$\xi\left(\sum_j \pi_j \beta_1(j) b_j(x_1)\right) 836.$$

Using the H-Logarithm method, the server determines 840 the encryption of log-probability of the observation sequence 845. FIG. 8B shows a pseudo code 850 of one embodiment of the H-Backward method. The pseudo code is also described in Appendix B.

Secure H-Viterbi Method

Figure 9A:
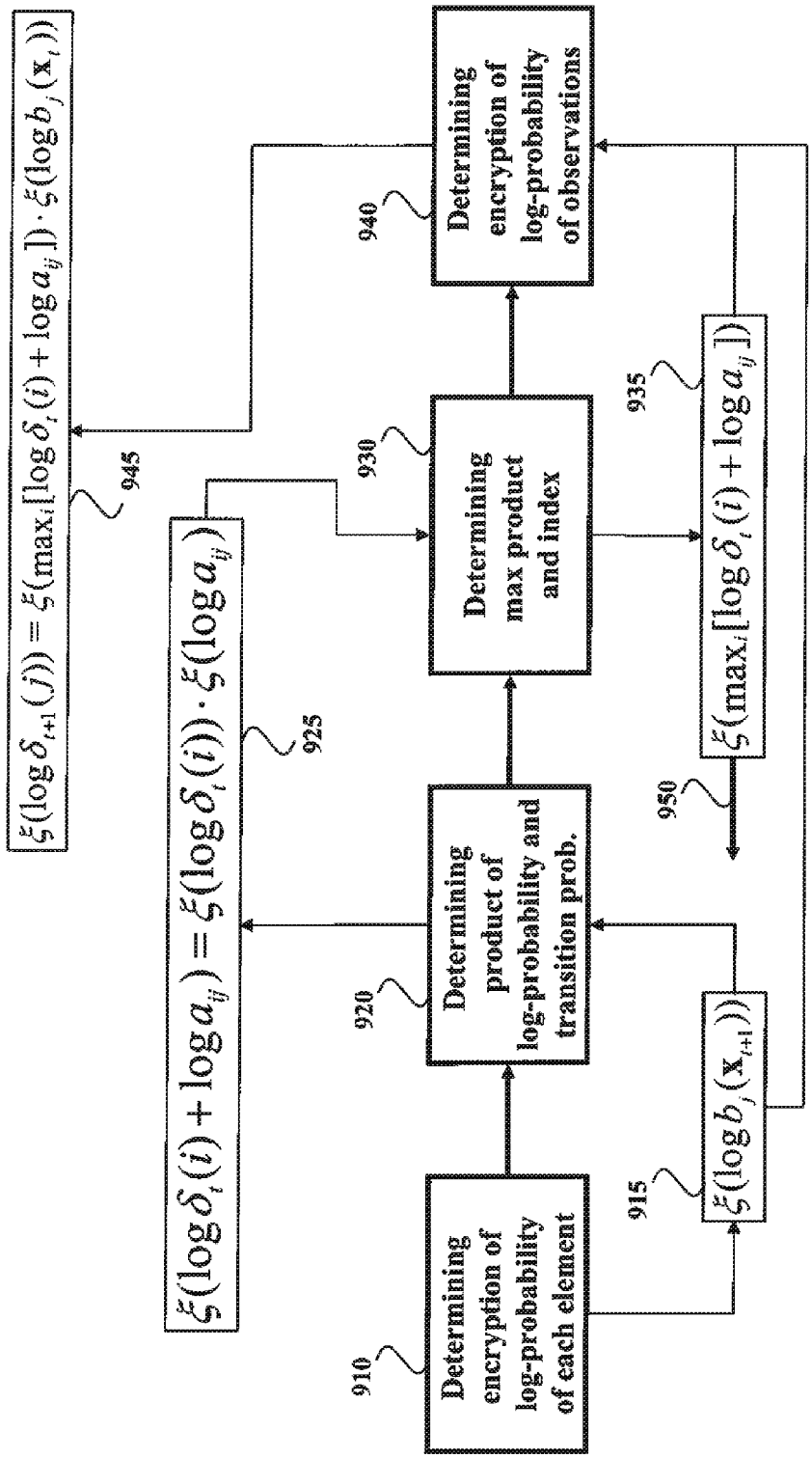

FIG. 9A shows a block diagram of the H-Viterbi method 900 in accordance with some embodiments of the invention. The method 900 is suitable for determining a most likely sequence of states corresponding to an observation sequence stored at a client, wherein the sequence of states is determined with respect to a HMM stored at a server. The client has the decryption key 150 and the encryption key 140 of an additively homomorphic cryptosystem, and the server has only the encryption key 140.

As before, the HMM λ is defined according to λ=(A, B, Π), wherein A=($α_{ij}$) is a state transition matrix, $α_{ij}$ is a transition probability from a state S$_i$ to a state S$_j$, wherein 1≤i, j≤N, and N is a number of states of the HMM, wherein B=(b$_1$, b$_2$, . . . , b$_N$) is a matrix of probabilities of observations, b$_j$ is a column vector of the matrix of probabilities over alphabet of the observation sequence, j=1, 2, . . . , N, wherein Π=(π$_1$, π$_2$, . . . , π$_N$) is an initial state probability vector of the HMM.

Various steps of the method 900 uses the H-SMC using an encryption function ξ(·) of the additively homomorphic cryptosystem and at least one property of additive homomorphism. Some steps of the method are performed iteratively for each state of the HMM and/or for each observation in the observation sequence X$_1$, X$_2$, . . . , X$_T$. At an output of the method, the client determines the most probable state sequence S$_{i*_1}$, S)$_{i*_2}$, . . . , S$_{i*_T}$.

The server determines 910, for each state of the HMM, an encryption of a log-probability ξ(log b$_j$(x$_t$)) 915 of a current element of the observation sequence. The encryption of the log-probability 915 can be determines using any SMC. For example, one embodiment determines the encryption of the log-probability using the H-SMC in a manner similar to the embodiment shown in FIG. 7B.

Specifically, one embodiment determines a modification vector and transmits a column vector of log-probabilities of the elements of the observation sequence modified with the modification vector to the client. For example, the modification vector (γ$_{tj}$) t=1, 2, . . . , T can be generated randomly, such that the transmitting the column vector includes transmitting log b$_j$+γ$_{tj}$.

The client processes the column vector, and the server receives the encryption of the log-probability of each element of the observation sequence modified with the modification vector, and removes the modification vector to produce the encryption of the log-probability of each element.

For example, the server can receive ξ(log b$_j$(x$_t$)+γ$_{tj}$) and can determine the encryption of the log-probability ξ(log b$_j$(x$_t$)) of each element x$_t$ using the property of additive homomorphism according to ξ(log b$_j$(x$_t$)+γ$_{tj}$)·ξ(−γ$_{tj}$).

The server determines 920, for each state of the HMM, a product of an encryption of the log-probability 925 of the state for the current element and an encryption of a transition probability to the state to produce a set of encrypted products. For example, the product of the encryption 925 can be determined using additive homomorphism according to ξ(log δ$_t$(i)+log α$_{ij}$)=ξ(log δ$_t$(i))·ξ(log α$_{ij}$), wherein ξ (log δ$_t$(i)) is an encryption of a logarithm of probability of most probable state sequence ending in the state S$_i$ for the current element x$_t$, ξ(·) is an encryption function of the additively homomorphic cryptosystem, ξ(log α$_{ij}$) is an encryption of a logarithm of the transition probability to the state S$_i$ from the state S$_j$.

Server, using H-SMC with the client, e.g., H-Comparison method, determines 930 an encrypted product 935 corresponding to a maximum product in the set of encrypted products and an encrypted index of the state corresponding to the maximum product. The encrypted index can be transmitted 950 to the client, such that the client can obtain a matrix of indexes of the states and track the indexes to determine the most probable state sequence.

Next, the server determines 940, for each state of the HMM, an encrypted log-probability 945 of the state for a next element as a product of the encrypted product and the encryption of a log-probability of the current element of the observation sequence corresponding to the state and repeating the determining 930 the encrypted product and the encrypted index, the transmitting 950 the encrypted index, and the determining 940 the log probability for all elements of the observation sequence.

For example, one embodiment determines the encrypted log-probability ξ(log δ$_{t+1}$(j)) according to ξ(log δ$_{t+1}$(j))=ξ (max$_i$[log δ$_t$(i)+log α$_{ij}$])·ξ(log b$_j$(x$_t$)), wherein log δ$_{t+1}$(j) is a logarithm of the probability of the most probable state sequence ending in a state S$_j$ for a next element x$_{t+1}$, ξ(·) is an encryption function of the additively homomorphic cryptosystem, wherein max is a maximum operation, log δ$_t$(i) is a logarithm of the probability of the most probable state sequence ending in a state S$_i$ for the current element x$_t$, log α$_{ij}$ is a logarithm of a transition probability from the state S$_i$ to the state S$_j$.

FIG. 9B shows a pseudo code 960 according to one embodiment of the H-Viterbi method.

Secure H-Baum-Welch Method

Figure 10A:
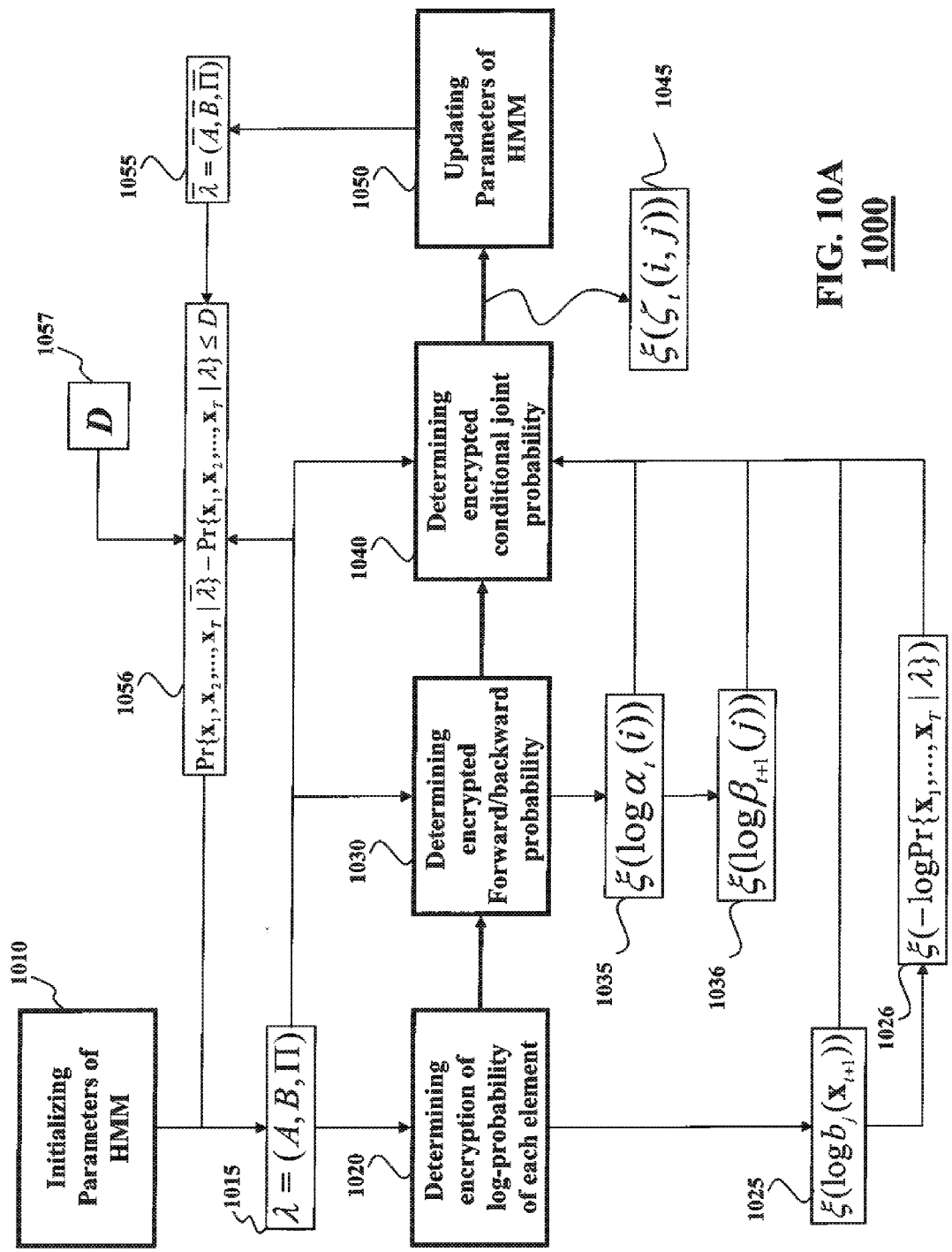

FIG. 10A shows a block diagram of a H-Baum-Welch method 1000 for determining parameters of a hidden Markov model (HMM) stored at a server based on an observation sequence stored at a client. The client has the decryption key 150 and the encryption key 140 of an additively homomorphic cryptosystem, and the server has only the encryption key 140.

The H-Baum-Welch method is based on secure computation of a conditional joint probability of each pair of states given the parameters of the HMM ζ$_t$(i, j) for all 1≤i, j≤N, 1≤t≤T. Taking logarithm at both sides of Equation (10) yields $$\log \zeta_t(i,j) = \log \alpha_t(i) + \log \beta_{t+1}(j) + \log \alpha_{ij} + \log b_j(x_{t+1}) - \log Pr\{x_1, \ldots, x_T | \lambda\},$$

(15). Thus, because the function $\xi(\cdot)$ is an additive homomorphic encryption function, Equation (15) can be rewritten as $$\xi(\log \zeta_t(i,j)) = \xi(\log \alpha_t(i)) \cdot \xi(\log \beta_{t+1}(j)) \cdot \xi(\log \alpha_{ij}) \cdot \xi(\log b_j(x_{t+1})) \cdot \xi(-\log Pr\{x_1, \ldots, x_T | \lambda\}). \quad (16)$$

The server initializes 1010 parameters 1015 of the HMM. For example, the parameters $\lambda=(A, B, \Pi)$ can be generated randomly. Based on the parameters 1015, the server using H-SMC with the client determines 1020 an encryption of a log-probability of a current element of the observation sequence 1025 and an encryption of a probability of the observation sequence 1026 with respect to the parameters of the HMM. The server also determines 1030, for each state of the HMM, an encrypted forward probability 1035 of the observation sequence with respect to the parameters of the HMM, and an encrypted backward probability 1036 of the observation sequence.

Next, the server determines 1040, for each element of the observation sequence, an encrypted conditional joint probability of each pair of states given the parameters of the HMM to produce a set of encrypted conditional joint probabilities 1045. In some embodiments, the determining is performed according to Equation (16) based on the encryption of the log-probability of the observation sequence, the encrypted forward probability, and the encrypted backward probability. The set of encrypted conditional joint probabilities is determined in encrypted domain using at least one property of additive homomorphism.

Based on the set of encrypted conditional joint probabilities, the parameters of the HMM are updated 1045. Some embodiments repeats iteratively, the determining the encryption of the probability of the observation sequence, the determining the encrypted forward probability, the determining the encrypted backward probability, the determining the encrypted conditional joint probability, and the updating the parameters until a difference 1056 between the probability of the observation sequence determined for the parameters 1055 of a current iteration and the probability of the observation sequence determined for parameters 1015 of a previous iteration is above a threshold D 1057.

In one embodiment, the encrypted log-forward probability $\xi(\log \alpha_t(i))$, the encryption of the log-probability $\xi(-\log Pr\{x_1, \ldots, x_T | \lambda\})$, and an encryption of a log-probability of an element $x_{t+1}$ of the observation sequence $\xi(\log b_j(x_{t+1}))$ are determined 1062 using the H-Forward method 700, as shown in FIG. 10B.

In the above description $\xi(\cdot)$ is an encryption function of the additively homomorphic cryptosystem $\log \alpha_t(i)$ is a logarithm of the forward probability of the observation sequence in a state $S_i$ up to the current element $x_t$, wherein $\log Pr\{x_1, \ldots, x_T | \lambda\}$ is a logarithm of the probability of the observation sequence $x_t$, $t=1, 2, \ldots T$, with respect to the parameters $\lambda=(A, B, \Pi)$, wherein $A=(\alpha_{ij})$ is a state transition matrix, $\alpha_{ij}$ is a transition probability from a state $S_i$ a state $S_j$, wherein $1 \leq i, j \leq N$, and N is a number of states of the HMM, wherein $B=(b_1, b_1, \ldots, b_N)$ is a matrix of probabilities of observations, $b_j$ is a column vector of the matrix of probabilities over alphabet of the observation sequence, $j=1, 2, \ldots, N$, and $\Pi=(\pi_1, \pi_2, \ldots, \pi_N)$ is an initial state probability vector of the HMM.

The encrypted log-backward probability $\xi(\log \beta_{t+1}(j))$ is determined 1064 using the H-Backward method 800. The encrypted logarithm of a conditional probability $\xi(\log \zeta_t(i,j))$ is determined 1066 using additive homomorphism according to $\xi(\log \zeta_t(i, j))=\xi(\log \alpha_t(i)) \cdot \xi(\log \beta_{t+1}(j)) \cdot \xi(\log \alpha_{ij}) \cdot \xi(\log b_j(x_{t+1})) \cdot \xi(-\log Pr\{x_1, \ldots, x_T | \lambda\})$, and the encrypted conditional joint probability is determined 1068 using an H-Exponent method 300. Similarly, an encryption $\xi(\gamma_t(i))$ of a total conditional probability $\gamma_t(i)$ is determined 1069 using at least one property of additive homomorphism according to $$\xi(\gamma_t(i)) = \prod_{j=1}^{N} \xi(\zeta_t(i, j)).$$

Figure 10C:
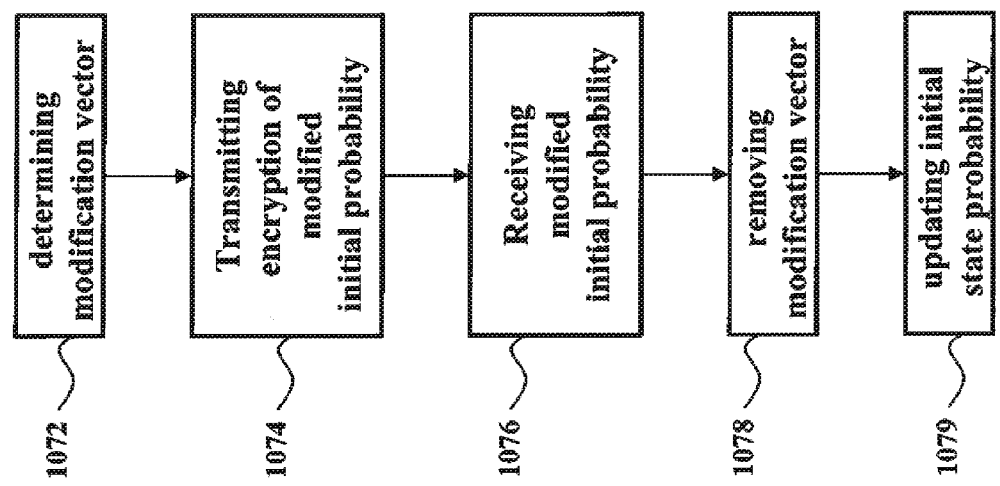

FIG. 10C shows a flow chart of a method for updating an initial state probability vector $(\overline{\pi}_t)_j$ according to one embodiment. The server determines 1072 a modification vector, and transmits 1074, for each state of the HMM, an encryption of an initial probability of the state modified with the modification vector in an encrypted domain to the client. The client decrypts the encryption such that the server receives 1076, for each state of the HMM, the initial probability of the state modified with the modification vector in an unencrypted domain. The server removes 1078 the modification vector to produce the initial probability in the unencrypted domain, and updates 1079 the initial state probability vector $(\overline{\pi}_t)_j$ based on the initial probability.

Figure 10D:
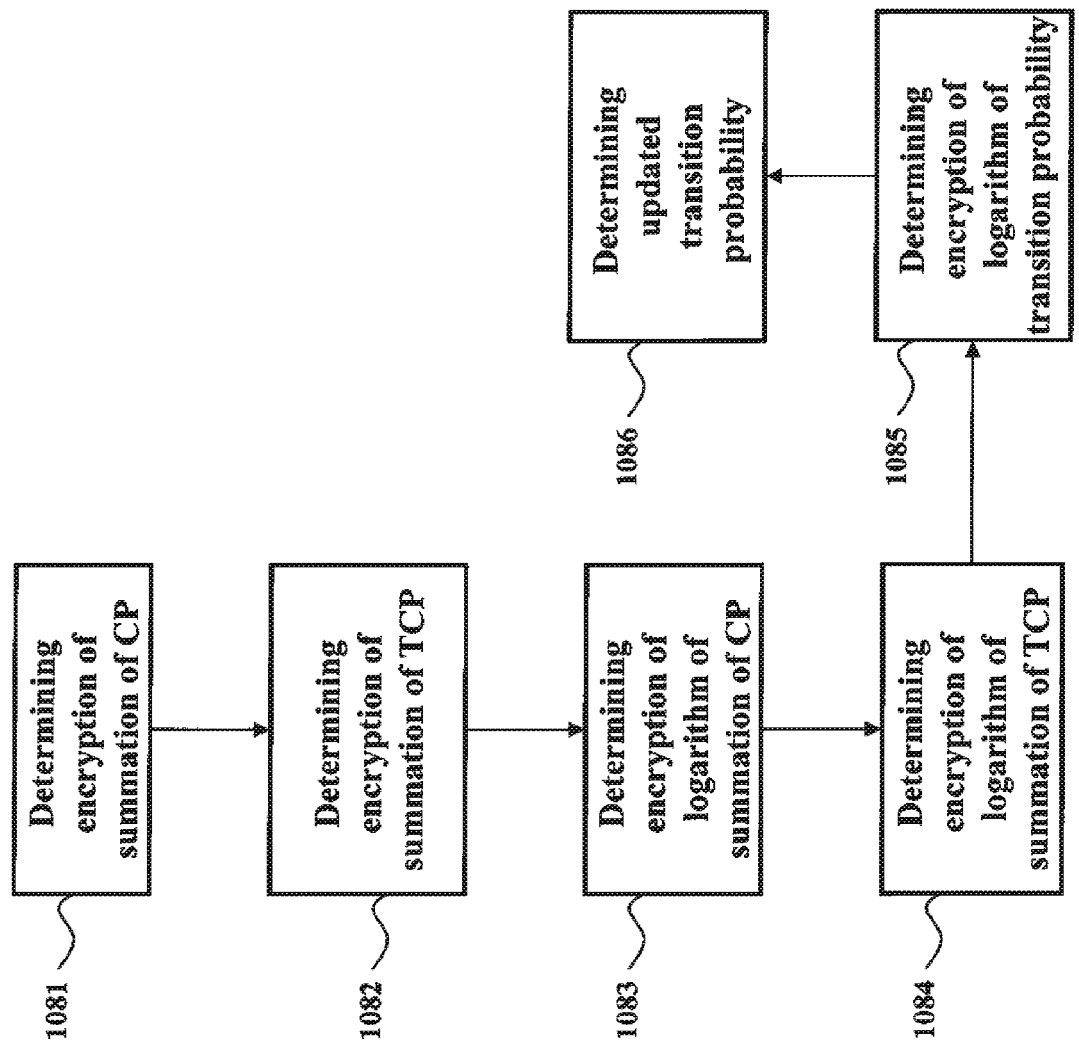

FIG. 10D shows a flow chart of a method for updating a transition probability parameter of the HMM. An encryption of a summation of the conditional probabilities $$\xi\left(\sum_{t=1}^{T-1} \zeta_t(i, j)\right)$$

is determined 1081 in the encrypted domain according to $$\xi\left(\sum_{t=1}^{T-1} \zeta_t(i, j)\right) = \prod_{t=1}^{T-1} \xi(\zeta_t(i, j)).$$

An encryption of a summation of the total conditional probabilities $$\xi\left(\sum_{t=1}^{T-1} \gamma_t(i)\right)$$

is determined 1082 in the encrypted domain according to $$\xi\left(\sum_{t=1}^{T-1} \gamma_t(i)\right) = \prod_{t=1}^{T-1} \xi(\gamma_t(i)).$$

An encryption of a logarithm of the summation of the conditional probabilities is determined 1083, using an H-Logarithm method, according to $$\xi\left(\log\left(\sum_{t=1}^{T-1} \zeta_t(i, j)\right)\right),$$

and an encryption of a logarithm of the summation of the total conditional probabilities is determined 1084, using an H-Logarithm method, according to $$\xi\left(\log\left(\sum_{t=1}^{T-1}\gamma_t(i)\right)\right).$$

An encryption of a logarithm of the transition probability $\xi(\log \bar{a}_{ij})$ is determined 1085 using the property of additive homomorphism according to $$\xi(\log\bar{a}_{ij}) = \xi\left(\log\left(\sum_{t=1}^{T-1}\zeta_t(i,j)\right)\right)\xi\left(-\log\left(\sum_{t=1}^{T-1}\gamma_t(i)\right)\right), \text{ and,}$$

for each pair of states of the HMM, the updated transition probability $\bar{a}_{ij}$ is determined 1086 using the SMC based on the encryption of the logarithm of the transition probability.

Figure 10E:
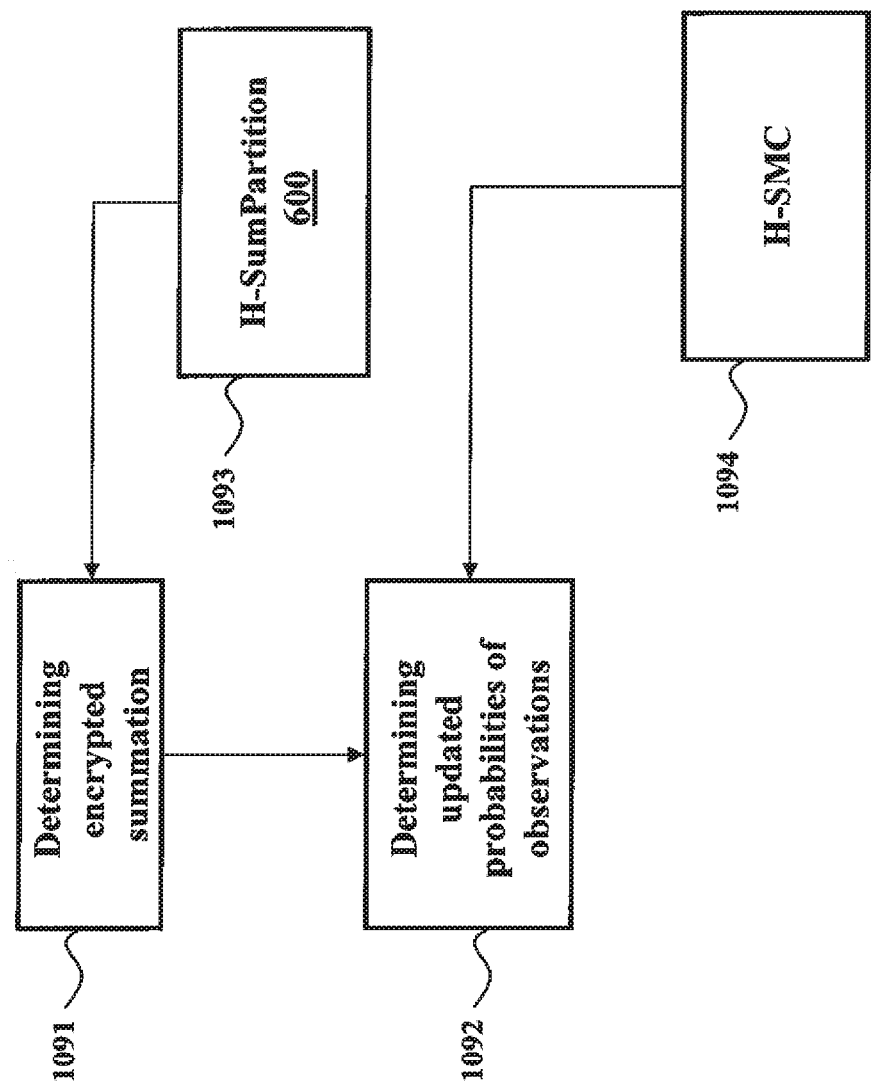

FIG. 10E shows a flow chart of a method for updating the probabilities of observations $\bar{b}_j(v_k)$. For each observation symbol of an alphabet $v_k$, an encrypted summation $$\xi\left(\sum_{t=1, x_t=v_k}^{T}\gamma_t(j)\right)$$

is determined 1091 using 1093 an H-SumPartition method 600, and the updated probabilities of observations $\bar{b}_j(v_k)$ are determined 1092 using 1094 the SMC.

After the parameters of HMM are updated the probability of the observation sequence $\Pr\{x_1, x_2, \ldots, x_T|\lambda\}$ of the current iteration is determined, using, e.g., the H-forward method, based on the updated parameters $\bar{\lambda}$ of the HMM. The probability is compared, using, e.g., the H-Comparison method, with the probability determined during the previous iteration. If the difference between the probabilities is below or equal the threshold, then the parameters of the HMM are selected as final parameters.

FIG. 10F shows a pseudo code 1099 of the H-Baum-Welch method according to one embodiment of the invention.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

APPENDIX A

Pseudo code of one embodiment implementing the H-Forward method

Input: Client sores observation sequence $x_1, x_2, \ldots, x_T$. Server stores the HMM $\lambda=(A, B, \Pi)$.

Output: Bob determines $\xi(\log \Pr\{x_1, x_2, \ldots, x_T|\lambda\})$.

1. For each $t=1, 2, \ldots, T$ and $j=1, 2, \ldots, N$, server randomly selects $\gamma_{tj}$ and generates a column vector $\log b_j + \gamma_{tj}$.

2. Based on the observation $x_t$, client uses 1-of-M OT to determine $\log b_j(x_t) + \gamma_{tj}$.

3. Client transmits $\xi(\log b_j(x_t) + \gamma_{tj})$ to server

4. Using $\gamma_{tj}$ and the homomorphic property, server determines $\xi(\log b_j(x_t)+\gamma_{tj})\cdot\xi(-\gamma_{tj})=\xi(\log b_j(x_t))$ for $j=1, 2, \ldots, N, t=1, 2, \ldots, T$.

5. Server determines $\xi(\log \alpha_1(j))=\xi(\log \pi_j)\cdot\xi(\log b_j(x_1))$ for $j=1, 2, \ldots, N$ 6. Induction Step: For $j=1, 2, \ldots, N$, with input $\xi(\log \alpha_t(j))$, $j=1, 2, \ldots, N$ and transition matrix $A=(\alpha_{ij})$, server and client execute H-LogSum method, at the end of which server determines $$\xi\left(\log \sum_{l=1}^{N} \alpha_t(l) a_{lj}\right).$$

7. For all $1 \leq t \leq T-1$, server determines $$\xi(\log \alpha_{t+1}(j)) = \xi\left(\log \sum_{l=1}^{N} \alpha_t(l) a_{lj}\right) \cdot \xi(\log b_j(x_{t+1}))$$

8. Server and client execute H-LogSum method, the end of which server determines $$\xi\left(\log \sum_{j=1}^{N} \alpha_T(j)\right) = \xi(\log P(x_1, x_2, \ldots, x_T | \lambda))$$

APPENDIX B

Pseudo code of one embodiment implementing the H-Backward method
1. Server determines $\xi(\log b_j(x_t))$ for $j=1, 2, \ldots, N$, $t=1, 2, \ldots T$;
2. Given the encryption $\xi(\log \beta_{t+1}(j))$, server determines $\xi(\log \beta_{t+1}(j)\alpha_{ij}b_j(x_{t+1})) = \xi(\log \beta_{t+1}(j) + \log \alpha_{ij} + \log b_j(x_{t+1})) = \xi(\log \beta_{t+1}(j))\xi(\log \alpha_{ij})\xi(\log b_j(x_{t+1}))$.
3. Using H-Exponent method, server determines $\xi(\beta_{t+1}(j)\alpha_{ij}b_j(x_{t+1}))$, and $$\xi(\beta_t(i)) = \xi\left(\sum_{j=1}^{N} \beta_{t+1}(j) a_{ij} b_j(x_{t+1})\right) = \prod_{j=1}^{N} \xi(\beta_{t+1}(j) a_{ij} b_j(x_{t+1}))$$

4. Using H-Logarithm method, server determines the encryption $\xi(\log \beta_t(i))$, until server has $\xi(\log \beta_1(i))$, $i=1, 2, \ldots, N$.
5. Using homomorphic property and the H-Exponent method, server determines $\xi(\pi_j \beta_1(j) b_j(x_1))$ and $$\xi\left(\sum_j \pi_j \beta_1(j) b_j(x_1)\right).$$

6. Using the H-Logarithm method, server determines $\xi(\log P(x_1, x_2, \ldots, x_T | \lambda))$.

APPENDIX C

Pseudo code of one embodiment implementing the H-Viterbi method
Input: Client stores an observation sequence $x_1, x_2, \ldots, x_T$. Server stores the HMM $\lambda = (A, B, \Pi)$.
Output: Client determines the most probable state sequence $S_{i*_1}, S_{i*_2}, \ldots, S_{i*_T}$.
1. For each $t=1, 2, \ldots, T$ and $j=1, 2, \ldots N$, server selects $\gamma_{tj}$, generates a column vector $\log b_j' \gamma_{tj}$ and transmits the column vector to client.
2. Using 1-of-MOT client determines $\log b_j(x_t) + \gamma_{tj}$.
3. Client transmits $\xi(\log b_j(x_t) + \gamma_{tj})$ to server
4. Using $\gamma_{tj}$ and the homomorphic property, server determines $\xi(\log b_j(x_t) + \gamma_{tj}) \cdot \xi(-\gamma_{tj}) = \xi(\log b_j(x_t))$ for $j=1, 2, \ldots, N$, $t=1, 2, \ldots, T$.
5. Server determines $\xi(\log \delta_1(j)) = \xi(\log \pi_j) \cdot \xi(\log b_j(x_1))$ for $j=1, 2, \ldots, N$
6. Iteration: Server determines $\xi(\log \delta_t(i) + \log \alpha_{ij}) = \xi(\log \delta_t(i)) \cdot \xi(\log \alpha_{ij})$ for all $i, j=1, 2, \ldots, N$ and $t$. For each pair $(t, j)$, server and client execute the secure maximum finding protocol with an input $\{\xi(\log \delta_t(i) + \log \alpha_{ij}): i=1, 2, \ldots, N\}$, and then server determines the encryption of the maximum $\xi(\max_i[\log \delta_t(i) + \log \alpha_{ij}])$, and $\xi(\log \delta_{t+1}(j)) = \xi(\max_i[\log \delta_t(i) + \log \alpha_{ij}]) \cdot \xi(\log b_j(x_t))$.
7. Server transmits indexes $\phi_{t+1}(j)$.
8. At the end of iteration, client receives the last an index matrix $[\phi_t(j)]_{tj}$, so client can track backward and determined the state sequence.

APPENDIX D

Pseudo code of one embodiment implementing the H-Baum-Welch method

Input: Client stores the observation sequence $x_1, \ldots, x_T$ and encryption and decryption key. Server stores the encryption key only Output: Server determines HMM parameters and without discovering anything about the observation sequence. Client determines no information about the parameters.
1. Server initializes the HMM parameters $\lambda = (A, B, \Pi)$;
2. Using H-Forward and H-Backward methods with input $x_1, \ldots, x_T$ and $\lambda$, server determines $\xi(\log \alpha_t(i))$, $\xi(\log \beta_{t+1}(j))$, $\xi(\log b_j(x_{t+1}))$ and $\xi(-\log \Pr\{x_1, \ldots, x_T | \lambda\})$.
3. Server determines $\xi(\log \zeta_t(i, j))$ from Equation (16).
4. Using H-Exponent method, server determines $\xi(\zeta_t(i, j))$ and $$\xi(\gamma_t(i)) = \prod_{j=1}^{N} \xi(\zeta_t(i, j))$$

using the homomorphic property of the encryption function $\xi$.
5. Server randomly selects $\theta_i$ and transmits to client the encryptions $\xi(\theta_i + \gamma_1(i))$. Client decrypts and transmits to server $\theta_i + \gamma_1(i)$, and server determines $\pi_i = \gamma_1(i)$.
6. Server determines the encryption $$\xi\left(\sum_{t=1}^{T-1} \zeta_t(i, j)\right) = \prod_{t=1}^{T-1} \xi(\zeta_t(i, j))$$

and $$\xi\left(\sum_{t=1}^{T-1} \gamma_t(i)\right) = \prod_{t=1}^{T-1} \xi(\gamma_t(i)).$$

Using H-Logarithm method, server determines $$\xi\left(\log \sum_{t=1}^{T-1} \zeta_t(i, j)\right), \xi\left(\log \sum_{t=1}^{T-1} \gamma_t(i)\right)$$

and the encryption $$\xi(\log \bar{a}_{ij}) = \xi\left(\log \sum_{t=1}^{T-1} \zeta_t(i,j)\right) \xi\left(\log \sum_{t=1}^{T-1} \gamma_t(i)\right),$$

and then server determines $\bar{\alpha}_{ij}$ using SMC with client.

7. Using H-SumPartition method with input sequence $x_1, \ldots, x_T$ and encryptions $\xi(\gamma_t(i))$, t=1, 2, ..., T and the common element $v_k$, server determines the encryption $$\xi\left(\sum_{t=1, x_t=v_k}^{T} \gamma_t(j)\right),$$

and $\bar{b}_j(v_k)$ according to Equation (13). Accordingly, server updates parameters of HMM $\bar{\lambda}=(\bar{A}, \bar{B}, \bar{\Pi})$.

8. Using the H-Forward method having as input the observation sequence and $\bar{\lambda}$, server determines $\Pr\{x_1, x_2, \ldots, x_T|\bar{\lambda}\}$.
9. Using H-Comparison method difference $\Pr\{x_1, x_2, \ldots, x_T|\bar{\lambda}\} - \Pr\{x_1, x_2, \ldots, x_T|\lambda\} \leq D$ is compared to threshold. If difference below threshold, server stops the method and selects the parameters $\bar{\lambda}$ as final; otherwise, server updates $\lambda$ in step 1 with $\bar{\lambda}$ and repeats previous steps.

We claim:

1. A method for determining parameters of a hidden Markov model (HMM) stored at a server based on an observation sequence stored at a client, wherein the client has a decryption key and an encryption key of an additively homomorphic cryptosystem, and the server has only the encryption key, comprising the steps of:
    initializing parameters of the HMM;
    determining an encryption of a probability of the observation sequence with respect to the parameters of the HMM using an H-SMC, wherein the H-SMC includes a secure multiparty computation (SMC) between the server and the client using at least one property of additive homomorphism;
    determining, for each state of the HMM, an encrypted forward probability of the observation sequence with respect to the parameters of the HMM using the SMC;
    determining, for each state of the HMM, an encrypted backward probability of the observation sequence using the H-SMC;
    determining, for each element of the observation sequence, an encrypted conditional joint probability of each pair of states given the parameters of the HMM to produce a set of encrypted conditional joint probabilities, wherein the determining is based on an encryption of a log-probability of the observation sequence, the encrypted forward probability, and the encrypted backward probability, wherein the determining is performed in an encrypted domain using at least one property of additive homomorphism; and
    updating, using the H-SMC having as input the set of encrypted conditional joint probabilities, the parameters of the HMM, wherein steps of the method are performed by the server.

2. The method of claim 1, further comprising:
    repeating iteratively, the determining the encryption of the probability of the observation sequence, the determining the encrypted forward probability, the determining the encrypted backward probability, the determining the encrypted conditional joint probability, and the updating the parameters until a difference between the probability of the observation sequence of a current iteration and the probability of the observation sequence of a previous iteration is above a threshold.

3. The method of claim 1, wherein the initializing comprises:
    generating randomly the parameters of the HMM.

4. The method of claim 1, further comprising:
    determining, using an H-Forward method, the encrypted log-forward probability $\xi(\log \alpha_t(i))$, the encryption of the log-probability $\xi(-\log \Pr\{x_1, \ldots, x_T|\lambda\})$, and an encryption: of a log-probability of an element $x_{t+1}$ of the observation sequence $\xi(\log b_j(x_{t+1}))$, wherein $\xi(\cdot)$ is an encryption function of the additively homomorphic cryptosystem, $\log \alpha_t(i)$ is a logarithm of the forward probability of the observation sequence in a state $S_i$ up to the current element $x_t$, wherein $\log \Pr\{x_1, \ldots, x_T|\lambda\}$ is a logarithm of the probability of the observation sequence $x_t$, t=1, 2, ..., T, with respect to the parameters $\lambda=(A, B, \Pi)$, wherein $A=(\alpha_{ij})$ is a state transition matrix, $\alpha_{ij}$ is a transition probability from a state $S_i$ to a state $S_j$, wherein $1 \leq i, j \leq N$, and N is a number of states of the HMM, wherein $B=(b_1, b_2, \ldots B_N)$ is a matrix of probabilities of observations, $b_j$ is a column vector of the matrix of probabilities over alphabet of the observation sequence, j=1, 2, ..., N, wherein $\Pi(\pi_1, \pi_2, \ldots, \pi_N)$ is an initial state probability vector of the HMM;
    determining, using an H-Backward method, the encrypted log-backward probability $\xi(\log \beta_{t+1}(j))$;
    determining an encrypted logarithm of a conditional probability $\xi(\log \zeta_t(i, j))$ according to $\xi(\log \zeta_t(i, j))=\xi(\log \alpha_t(i)) \cdot \xi(\log \beta_{t+1}(j)) \cdot \xi(\log \alpha_{ij}) \cdot \xi(\log b_j)(x_{t+1})) \cdot \xi(-\log \Pr\{x_1, \ldots, x_T|\lambda\})$; and
    determining the encrypted conditional joint probability using an H-Exponent method.

5. The method of claim 4, further comprising:
    determining an encryption $\xi(\gamma_t(i))$ of a total conditional probability $\gamma_t(i)$ using at least one property of additive homomorphism according to $$\xi(\gamma_t(i)) = \prod_{j=1}^{N} \xi(\zeta_t(i,j)).$$

6. The method of claim 5, further comprising:
    determining a modification vector;
    transmitting, for each state of the HMM, an encryption of an initial probability of the state modified with the modification vector in an encrypted domain to the client;
    receiving, for each state of the HMM, the initial probability of the state modified with the modification vector in an unencrypted domain; and
    removing the modification vector to produce the initial probability in the unencrypted domain.

7. The method of claim 6, further comprising:
    updating an initial state probability vector $(\bar{\pi}_i)$, based on the initial probability.

8. The method of claim 5, further comprising:
    determining an encryption of a summation of the conditional probabilities $$\xi\left(\sum_{t=1}^{T-1} \zeta_t(i, j)\right)$$

in the encrypted domain according to $$\xi\left(\sum_{t=1}^{T-1} \zeta_t(i, j)\right) = \prod_{t=1}^{T-1} \xi(\zeta_t(i, j));$$

determining an encryption of a summation of the total conditional. probabilities $$\xi\left(\sum_{t=1}^{T-1} \gamma_t(i)\right)$$

in the encrypted domain according to $$\xi\left(\sum_{t=1}^{T-1} \gamma_t(i)\right) = \prod_{t=1}^{T-1} \xi(\gamma_t(i));$$

determining, using an H-Logarithm method, an encryption of a logarithm of the summation of the conditional probabilities $$\xi\left(\log\left(\sum_{t=1}^{T-1} \zeta_t(i, j)\right)\right);$$

determining, using the H-Logarithm method, an encryption of a logarithm of the summation of the total conditional probabilities $$\xi\left(\log\left(\sum_{t=1}^{T-1} \gamma_t(i)\right)\right);$$

determining an encryption of a logarithm of the transition probability $\xi(\log \overline{a}_{ij})$ using the property of additive homomorphism according to $$\xi(\log \overline{a}_{ij}) = \xi\left(\log\left(\sum_{t=1}^{T-1} \zeta_t(i, j)\right)\right)\xi\left(-\log\left(\sum_{t=1}^{T-1} \gamma_t(i)\right)\right);$$

and determining, for each pair of states of the HMM using the SMC based on the encryption of the logarithm of the transition probability, an updated transition probability an updated transition probability $\overline{a}_{ij}$.

9. The method of claim 5, further comprising;

determining, for each observation symbol of an alphabet $v_k$, using an H-SumPartition method, an encrypted summation $$\xi\left(\sum_{t=1,x_t=v_k}^{T} \gamma_t(j)\right);$$

and determining, using the SMC, an updated probabilities of observations $\overline{b}_j(v_k)$.

10. The method of claim 2, further comprising:
determining, using an H-forward method during the current iteration, the probability of the observation sequence $\Pr\{x_1, x_2, \ldots, x_T | \overline{\lambda}\}$ of the current iteration based on an updated parameters $\overline{\lambda}$ of the HMM, wherein $x_t$ is the observation sequence, t=1, 2 . . . T; and
determining the difference using an H-Comparison method.

11. The method of claim 2, further comprising:
selecting the parameters of the HMM as final parameters when the difference is below or equal the threshold.

12. A method for determining parameters of a hidden Markov model (HMM) stored at a server based on an observation sequence stored at a client, wherein the client has a decryption key and an encryption key of an additively homomorphic cryptosystem, and the server has only the encryption key, comprising the steps of:
initializing parameters of the HMM and
updating the parameters iteratively until a difference between a probability of the observation sequence of a current iteration and a probability of the observation sequence of a previous iteration is above a threshold, wherein, for each iteration, the parameters are updated based on an encrypted conditional joint probability of each pair of states given the observation sequence and the parameters of the HMM wherein the encrypted conditional joint probability is determining in an encrypted domain using a secure multiparty computation (SMC) between the server and the client, wherein steps of the method are performed by the server.

13. The method of claim 12, wherein the SMC uses at least one property of additive homomorphism of the additively homomorphic cryptosystem.

14. The method of claim 12, further comprising:
determining an encryption of probability of the observation sequence of the previous iteration with respect to the parameters of the HMM using an H-SMC, wherein the H-SMC includes a secure multiparty computation (SMC) between the server and the client using at least one property of additive homomorphism;
determining, for each state of the HMM, an encrypted forward probability of the observation sequence with respect to the parameters of the HMM using the SMC;
determining, for each state of the HMM, an encrypted backward. probability of the observation sequence using the H-SMC;
determining, for each element of the observation sequence, an encrypted conditional joint probability of each pair of states given the parameters of the HMM to produce a set of encrypted conditional joint probabilities, wherein the determining is based on a encryption of a log-probability of the observation sequence, the encrypted forward probability, and the encrypted backward probability;
updating, using the H-SMC having as input the set of encrypted conditional joint probabilities, the parameters of the HMM;
determining an encryption of a probability of the observation sequence of a current iteration with respect to updated parameters of the HMM using an H-SMC; and determining the difference between the encrypted probability of the observation sequence of the current iteration and the encrypted probability of the observation sequence of the previous iteration using the H-SMC.

15. A server for determining parameters of a hidden Markov model (HMM) based on an observation sequence stored at a client, wherein the client has a decryption key and an encryption key of an additively homomorphic cryptosystem, and the server has only the encryption key, comprising a processor configured for:

initializing parameters of the HMM; and updating the parameters iteratively until a difference between a probability of the observation sequence of a current iteration and a probability of the observation sequence of a previous iteration is above a threshold, wherein, for each iteration, the parameters are updated based on an encrypted conditional joint probability of each pair of states given the observation sequence and the parameters of the HMM, wherein the encrypted conditional joint probability is determining in an encrypted domain using an H-SMC, wherein the H-SMC includes a secure multiparty computation (SMC) between the server and the client using at least one property of additive homomorphism.

16. The server of claim 15, wherein the processor is configured for:

determining an encryption of probability of the observation sequence of the previous iteration with respect to the parameters of the HMM using an H-SMC, wherein the H-SMC includes a secure multiparty computation (SMC) between the server and the client using at least one property of additive homomorphism;

determining, for each state of the HMM, an encrypted forward probability of the observation sequence with respect to the parameters of the HMM using the SMC;

determining, for each state of the HMM, an encrypted backward probability of the observation sequence using the H-SMC;

determining, for each element of the observation sequence, an encrypted conditional joint probability of each pair of states given the parameters of the HMM to produce a set of encrypted conditional joint probabilities, wherein the determining is based on an encryption of a log-probability of the observation sequence, the encrypted forward probability, and the encrypted backward probability;

updating, using the H-SMC having as input the set of encrypted conditional joint probabilities, the parameters of the HMM;

determining an encryption of a probability of the observation sequence of a current iteration with respect to updated parameters of the HMM using an H-SMC; and determining the difference between the encrypted probability of the observation sequence of the current iteration and the encrypted probability of the observation sequence of the previous iteration using the H-SMC.

* * * * *